United States Patent
Grisolia et al.

(10) Patent No.: US 9,562,359 B1
(45) Date of Patent: Feb. 7, 2017

(54) STUCCO WALL STRUCTURE

(71) Applicant: Bayer MaterialScience LLC, Pittsburgh, PA (US)

(72) Inventors: Anthony Grisolia, Leechburg, PA (US); Bruce Dickson, West Mifflin, PA (US)

(73) Assignee: Covestro LLC, Pittsburgh, PA (US)

( * ) Notice: Subject to any disclaimer, the term of this patent is extended or adjusted under 35 U.S.C. 154(b) by 0 days.

(21) Appl. No.: 14/816,668

(22) Filed: Aug. 3, 2015

(51) Int. Cl.
| | | |
|---|---|---|
| *E04C 1/00* | (2006.01) | |
| *E04F 13/04* | (2006.01) | |
| *E04B 1/76* | (2006.01) | |
| *E04B 2/70* | (2006.01) | |
| *E04F 13/06* | (2006.01) | |

(52) U.S. Cl.
CPC ............. *E04F 13/04* (2013.01); *E04B 1/7604* (2013.01); *E04B 1/7654* (2013.01); *E04B 2/70* (2013.01); *E04F 13/06* (2013.01)

(58) Field of Classification Search
CPC ......... E04F 13/04; E04F 13/06; E04B 1/7604; E04B 2/70; E04B 1/7654
USPC .................. 52/309.8, 302.1, 404.1, 405.3
See application file for complete search history.

(56) References Cited

U.S. PATENT DOCUMENTS

| | | | | |
|---|---|---|---|---|
| 4,478,018 A | * | 10/1984 | Holand .................. | E04B 1/762 52/220.1 |
| 4,943,185 A | * | 7/1990 | McGuckin ............. | E02D 31/02 210/170.07 |
| 5,353,560 A | | 10/1994 | Heydon | |
| 5,819,496 A | * | 10/1998 | Sperber ................. | E04B 1/7604 52/404.1 |
| 5,950,386 A | | 9/1999 | Shipman et al. | |
| 5,953,883 A | | 9/1999 | Ojala | |
| 6,085,479 A | | 7/2000 | Carver | |
| 6,119,422 A | * | 9/2000 | Clear ....................... | E04C 2/26 52/268 |
| 6,279,284 B1 | * | 8/2001 | Moras ...................... | E04B 1/10 52/105 |
| 6,314,695 B1 | | 11/2001 | Belleau | |
| 6,332,304 B1 | | 12/2001 | Fuhrman | |
| 6,355,333 B1 | * | 3/2002 | Waggoner ............... | E04B 1/62 428/174 |
| 6,438,915 B1 | | 8/2002 | Beauboeuf | |
| 6,584,749 B2 | * | 7/2003 | Sperber ................. | E04B 1/7604 52/404.1 |
| 6,745,531 B1 | * | 6/2004 | Egan ....................... | E04B 1/70 52/302.1 |
| 6,854,218 B2 | | 2/2005 | Weiss | |
| 6,951,079 B2 | | 10/2005 | Weiss | |
| 7,036,284 B1 | | 5/2006 | Larson | |
| 7,127,856 B2 | | 10/2006 | Hagen, Jr. et al. | |
| 7,168,216 B2 | * | 1/2007 | Hagen, Jr. ............... | B29C 44/186 52/404.3 |
| 7,196,024 B2 | * | 3/2007 | Lubker, II ................ | B32B 5/12 442/208 |

(Continued)

FOREIGN PATENT DOCUMENTS

| | | |
|---|---|---|
| WO | 9914442 | 3/1999 |
| WO | 9929978 | 6/1999 |
| WO | 2009006441 A2 | 1/2009 |

*Primary Examiner* — Basil Katcheves
(74) *Attorney, Agent, or Firm* — Donald R. Palladino

(57) ABSTRACT

Wall structures and methods for producing wall structures are described in this specification. The wall structures include a frame, a sheathing board attached to the frame, a foam layer, a bond break layer, a lath layer, and a stucco layer.

21 Claims, 18 Drawing Sheets

(56) References Cited

U.S. PATENT DOCUMENTS

| | | |
|---|---|---|
| 8,033,065 B2 | 10/2011 | Paetkau et al. |
| 8,065,846 B2 | 11/2011 | McDonald et al. |
| 8,365,497 B2 | 2/2013 | Rothwell |
| 8,397,387 B2 | 3/2013 | Cole et al. |
| 8,397,465 B2 | 3/2013 | Hansbro et al. |
| 8,458,983 B2 | 6/2013 | Propst |
| 8,635,778 B1 | 1/2014 | Hagaman |
| 8,696,966 B2 * | 4/2014 | Smith ............... B29C 39/10 264/261 |
| 8,844,243 B1 | 9/2014 | Gillman |
| 8,925,270 B2 | 1/2015 | Grisolia et al. |
| 8,959,862 B1 | 2/2015 | Kreizinger |
| 2004/0016194 A1 | 1/2004 | Stefanutti et al. |
| 2004/0200171 A1 | 10/2004 | Schilger |
| 2005/0055973 A1 | 3/2005 | Hagen, Jr. et al. |
| 2005/0106360 A1 | 5/2005 | Johnston et al. |
| 2005/0247021 A1 | 11/2005 | Schauffele |
| 2008/0016802 A1 * | 1/2008 | Rheaume ............... E04C 2/26 52/220.1 |
| 2010/0011701 A1 | 1/2010 | Cole et al. |
| 2010/0071292 A1 * | 3/2010 | Futterman ............ E04F 13/02 52/412 |
| 2011/0173911 A1 | 7/2011 | Propst |
| 2011/0197528 A1 * | 8/2011 | Egan ................ E04B 1/762 52/302.1 |
| 2011/0214374 A1 | 9/2011 | Propst |
| 2012/0011792 A1 | 1/2012 | DeWildt et al. |
| 2012/0028563 A1 | 2/2012 | Sacks et al. |
| 2012/0096785 A1 | 4/2012 | Weeks |
| 2012/0240501 A1 | 9/2012 | Spiegel |
| 2012/0247040 A1 | 10/2012 | Buoni et al. |
| 2013/0104480 A1 | 5/2013 | Smith |
| 2013/0305643 A1 | 11/2013 | Singleton et al. |
| 2013/0312350 A1 | 11/2013 | Kreizinger |
| 2014/0115991 A1 | 5/2014 | Sievers et al. |
| 2014/0260034 A1 * | 9/2014 | Ciuperca ............. E04C 2/296 52/405.3 |
| 2014/0265027 A1 | 9/2014 | Kreizinger |
| 2015/0093535 A1 | 4/2015 | Lambach et al. |

* cited by examiner

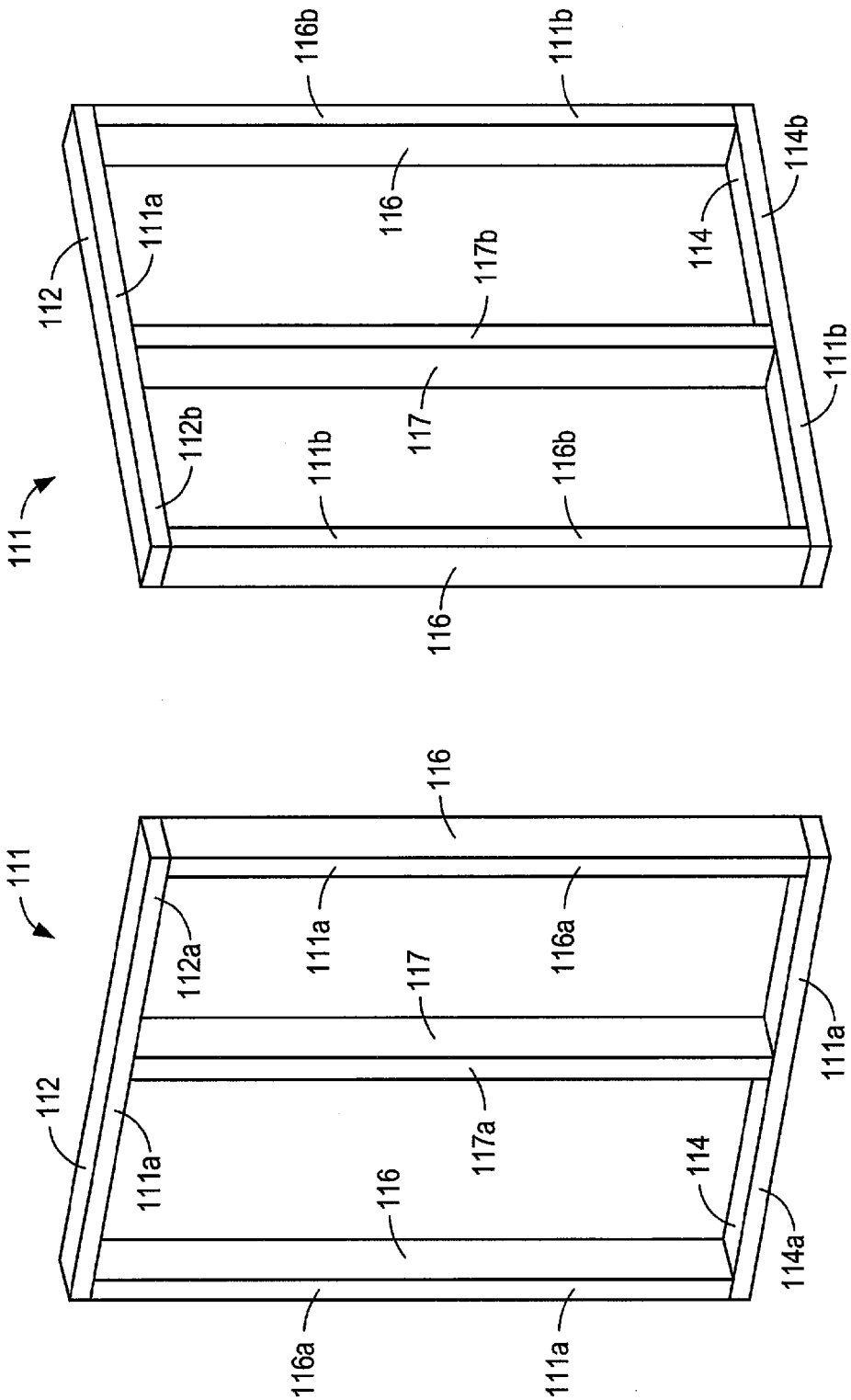

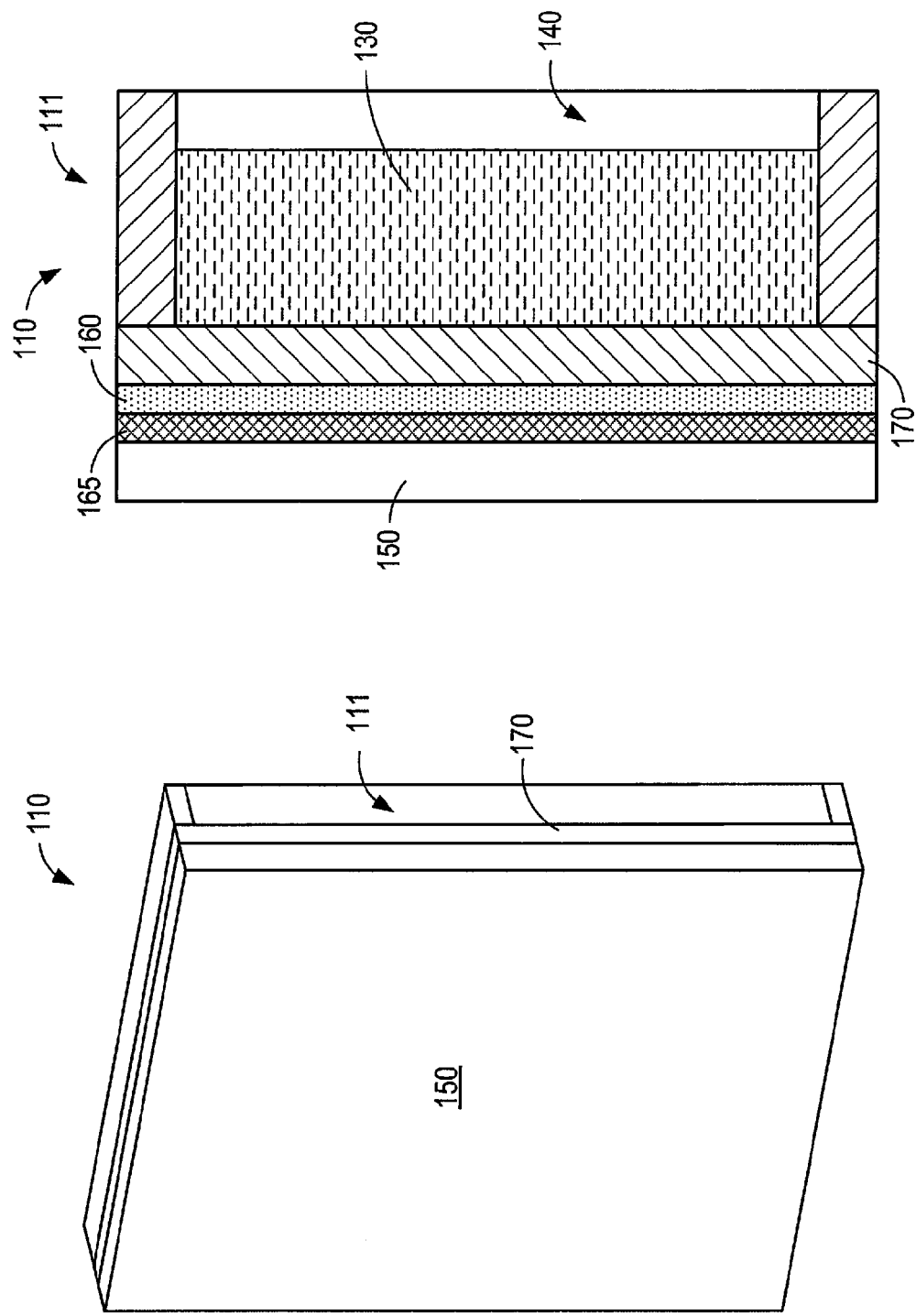

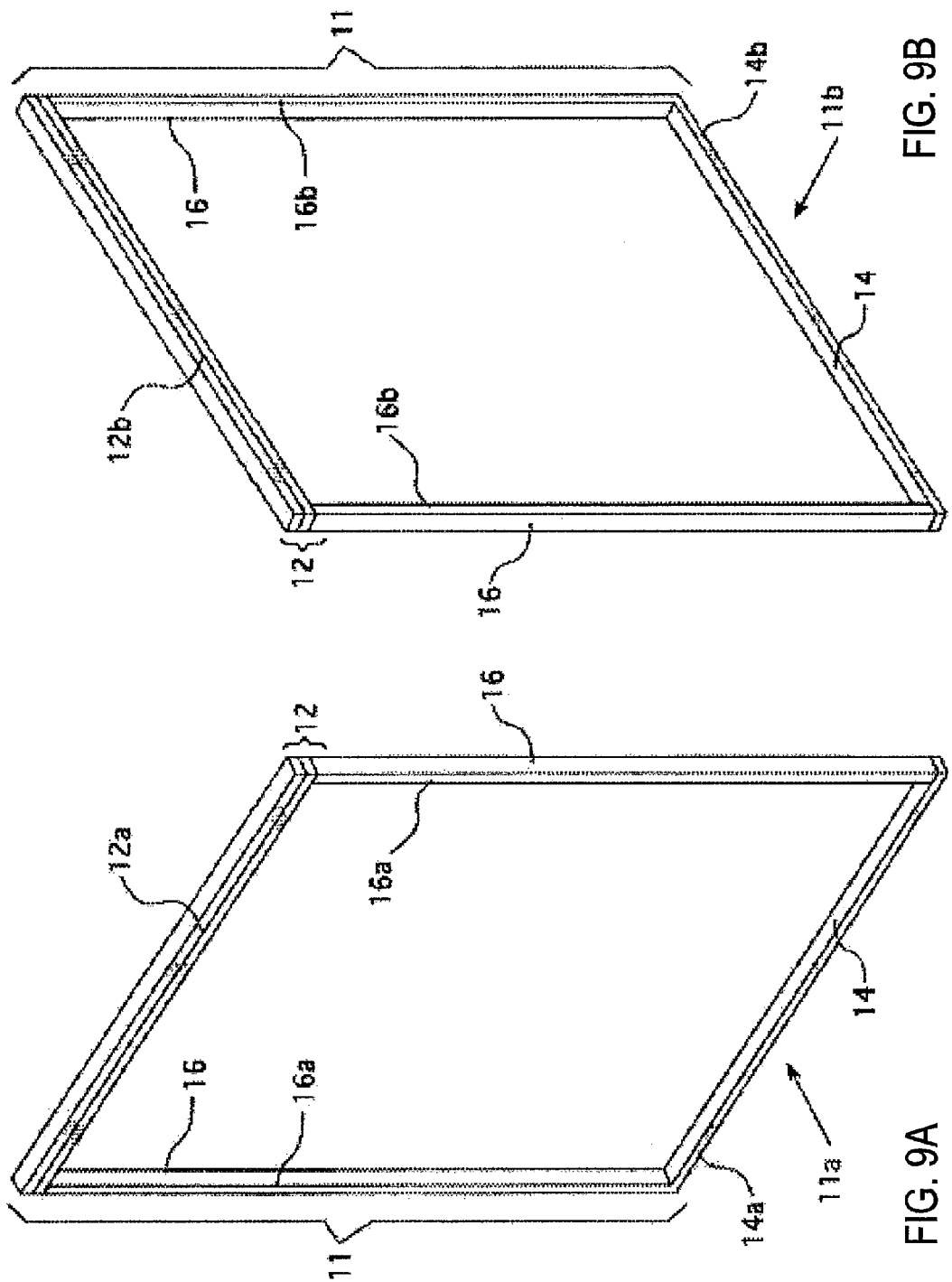

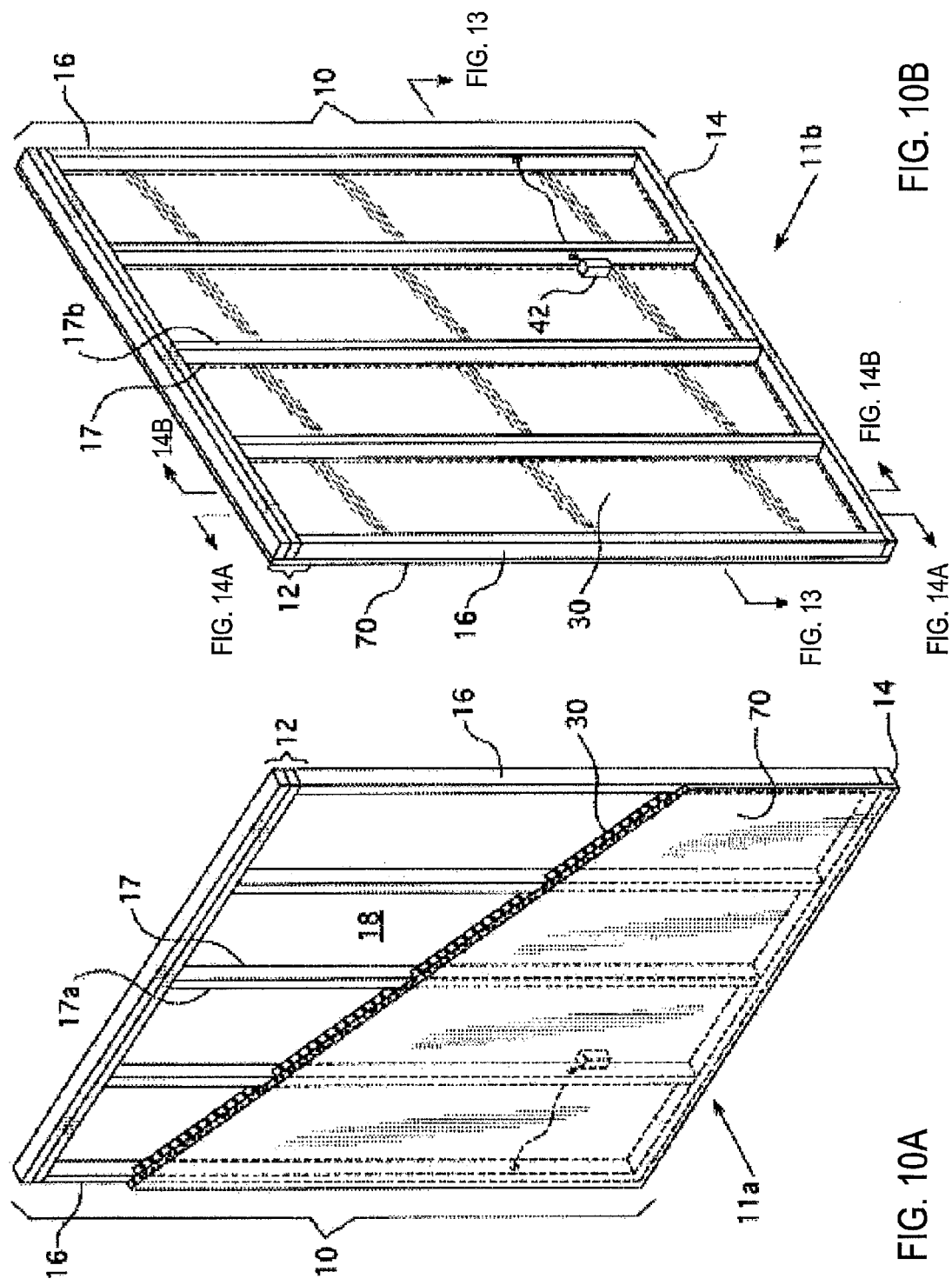

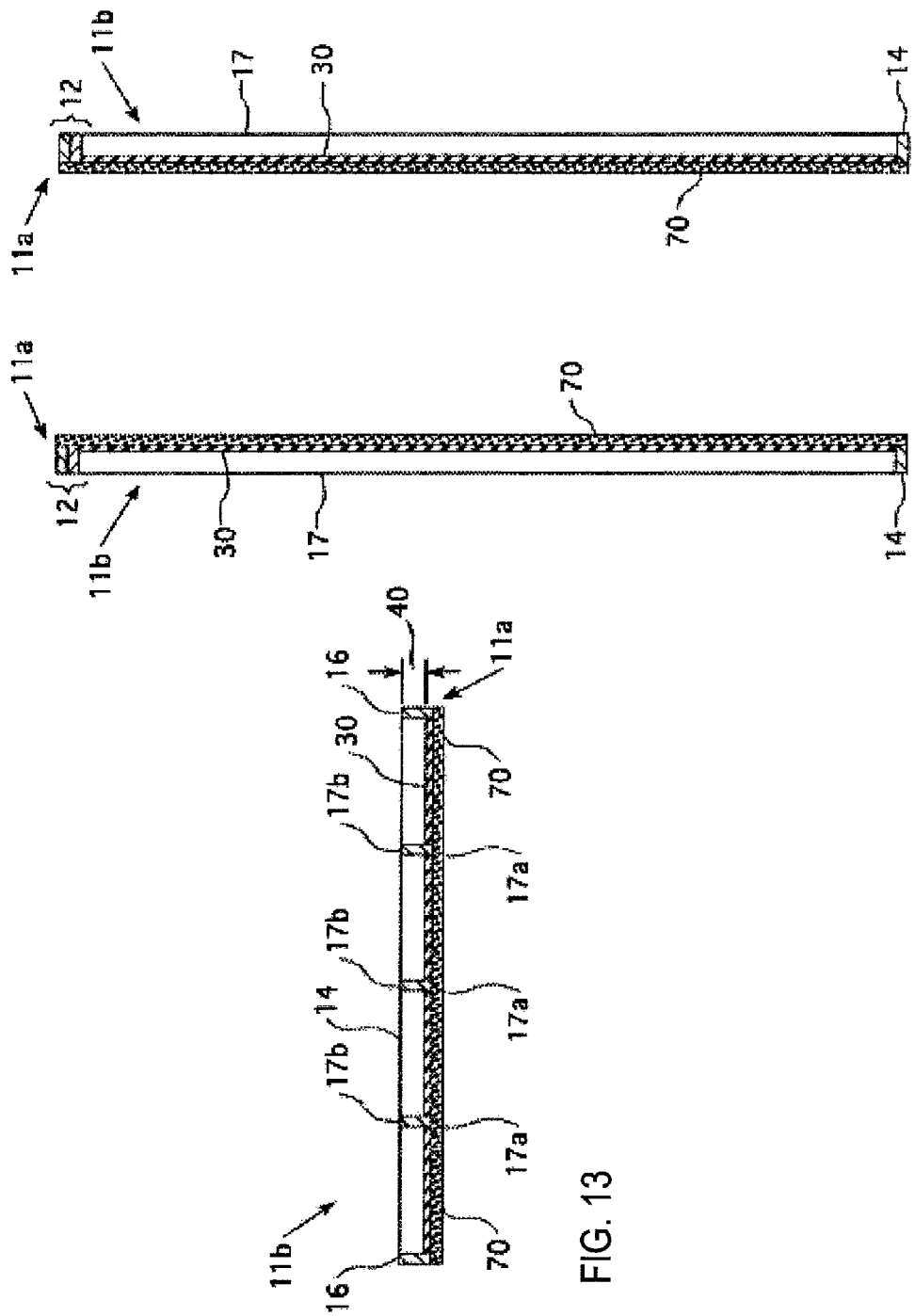

US 9,562,359 B1

STUCCO WALL STRUCTURE

BACKGROUND

The information described in this background section is not admitted to be prior art.

Modern stucco is a cement-based material used primarily as a cladding/veneer on the exterior-facing walls of residential and commercial buildings. Most stucco compositions comprise a mixture of sand, Portland cement, lime, and water. Specific stucco formulations can also comprise additives including, for example, pigments or other colorants, reinforcing fibers, and synthetic acrylic polymers. In residential and commercial construction, stucco is typically applied by hand to form the exterior-facing surface of building walls. In the United States, for example, stucco-clad buildings, including residential homes and commercial structures, are commonly constructed in the relatively drier southwest portions of the country (e.g., in the states of Arizona, New Mexico, Nevada, and southern California). However, the combination of low cost, low maintenance, fire-resistance, weather-resistance, and high racking strength make stucco an excellent material of construction for buildings in many environments.

SUMMARY

This specification relates to wall structures and methods for producing wall structures.

In one example, a wall structure comprises a frame, a sheathing board attached to the frame, a foam layer, a bond break layer, a lath layer, and a stucco layer.

In another example, a wall structure comprises a frame and a sheathing board attached to the frame. The frame comprises a first member, a second member spaced apart from the first member, and two side members extending between the first member and the second member. The first member, the second member, and the two side members each comprise a front surface and a rear surface that form a front frame surface and a rear frame surface. The sheathing board is attached to the front frame surface. The sheathing board, the first and second members, and the two side members define a cavity within the frame, and a foam layer is located within the cavity and adhered to a rear-facing surface of the sheathing board. A bond break layer is located adjacent to a front-facing surface of the sheathing board. A lath layer is located adjacent to the bond break layer. A stucco layer is integrated into the lath layer.

In another example, a method for producing a wall structure comprises providing a wall panel. The wall panel comprises a frame comprising a first member, a second member spaced apart from the first member, and two side members extending between the first member and the second member. The first member, the second member, and the two side members each comprise a front surface and a rear surface that form a front frame surface and a rear frame surface. A sheathing board is attached to the front frame surface. The sheathing board, the first and second members, and the two side members define a cavity within the frame, and a foam layer is located within the cavity and adhered to a rear-facing surface of the sheathing board. The method further comprises positioning a bond break layer and a lath layer adjacent to the front-facing surface of the sheathing board, attaching the bond break layer and the lath layer to the frame, and applying a stucco layer integrated into the lath layer.

It is understood that the inventions described in this specification are not necessarily limited to the examples summarized in this Summary.

BRIEF DESCRIPTION OF THE DRAWINGS

Various features and characteristics of the inventions described in this specification may be better understood by reference to the accompanying figures, in which:

FIG. 5A is a front perspective view schematic diagram of a frame component of a wall panel; and FIG. 5B is a rear perspective view schematic diagram of the frame shown in FIG. 5A;

FIGS. 6A-6E are a series of perspective view schematic diagrams showing the construction of a wall structure comprising a frame, a sheathing board attached to the frame, a foam layer, a bond break layer, a lath layer, and a stucco layer;

FIGS. 7A-7E are a series of side cross-sectional schematic diagrams respectively corresponding to FIGS. 6A-6E and showing the construction of a wall structure comprising a frame, a sheathing board attached to the frame, a foam layer, a bond break layer, a lath layer, and a stucco layer;

FIG. 9A is a front perspective view of a wall panel frame; and FIG. 9B is a rear perspective view of the wall structure frame shown in FIG. 9A;

FIG. 10A is a front perspective view of a wall panel comprising a sheathing board and a foam layer shown in partial sectional view; and FIG. 10B is rear perspective view of the wall panel shown in FIG. 10A;

FIG. 13 is a top cross-sectional view of the wall panel shown in FIGS. 10A and 10B;

FIG. 14A is a side cross-sectional view of the wall panel shown in FIGS. 10A and 10B; and FIG. 14B is a side cross-sectional view of the wall panel shown in FIG. 14A.

Figure 1A:
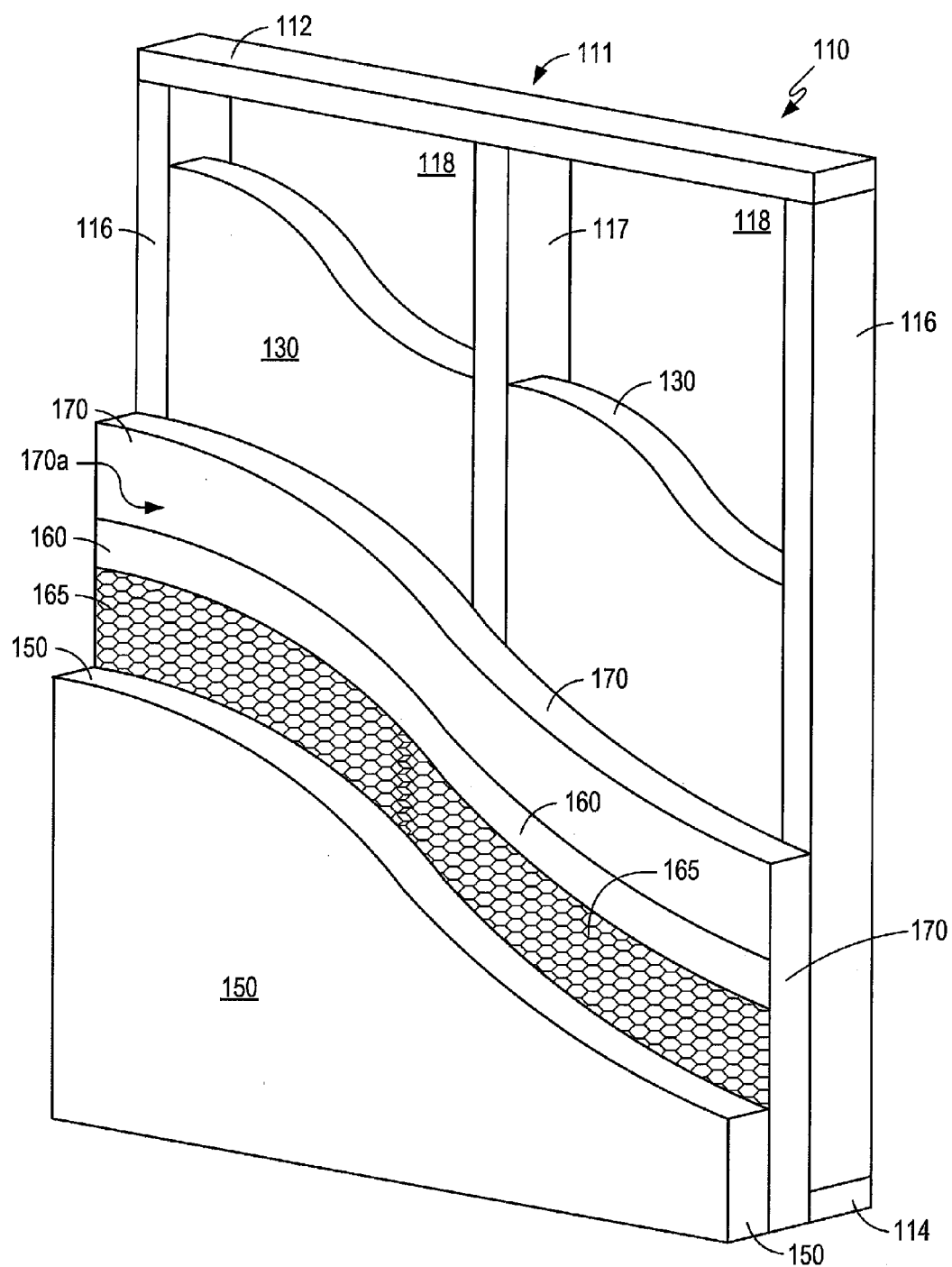
FIG. 1A is a front perspective view, partial sectional schematic diagram of a wall structure comprising a frame, a sheathing board attached to the frame, a foam layer, a bond break layer, a lath layer, and a stucco layer.
Figure 1B:
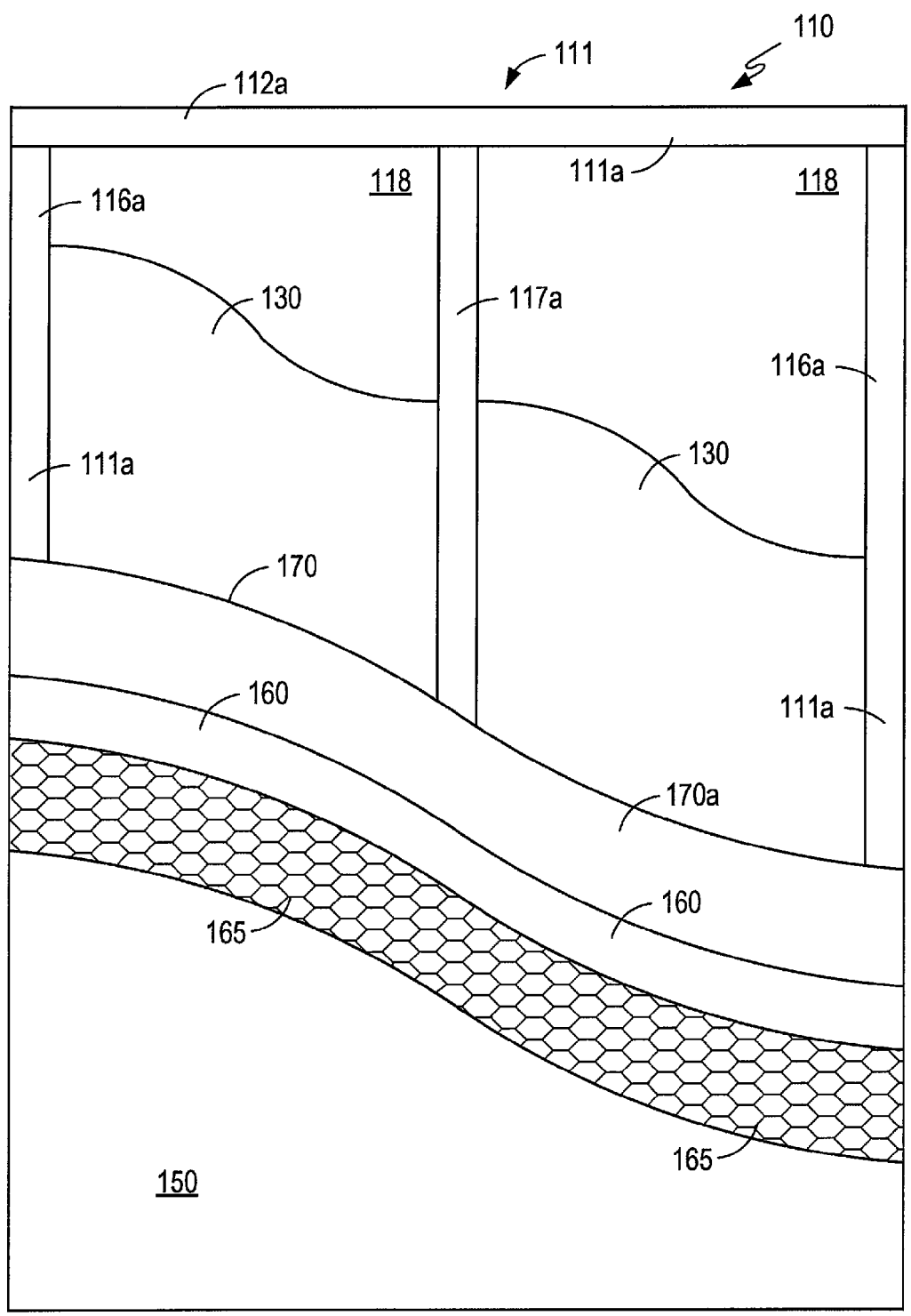
FIG. 1B is a front plan view, partial sectional schematic diagram of the wall structure shown in FIG. 1A.
Figure 2A:
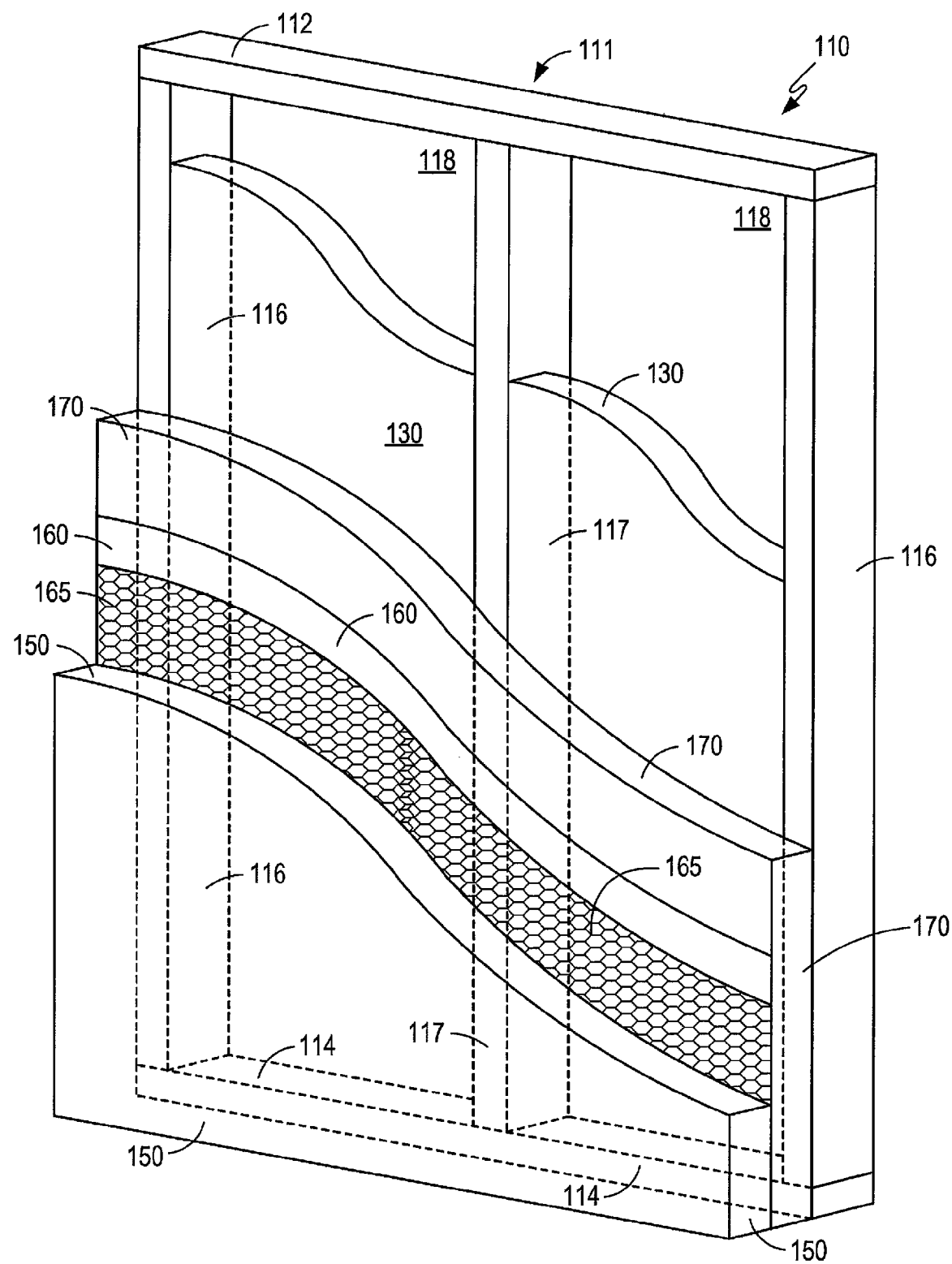
FIG. 2A is a front perspective view, partial sectional schematic diagram of a wall structure comprising a frame, a sheathing board attached to the frame, a foam layer, a bond break layer, a lath layer, and a stucco layer (showing the underlying frame structure in dashed line)
Figure 2B:
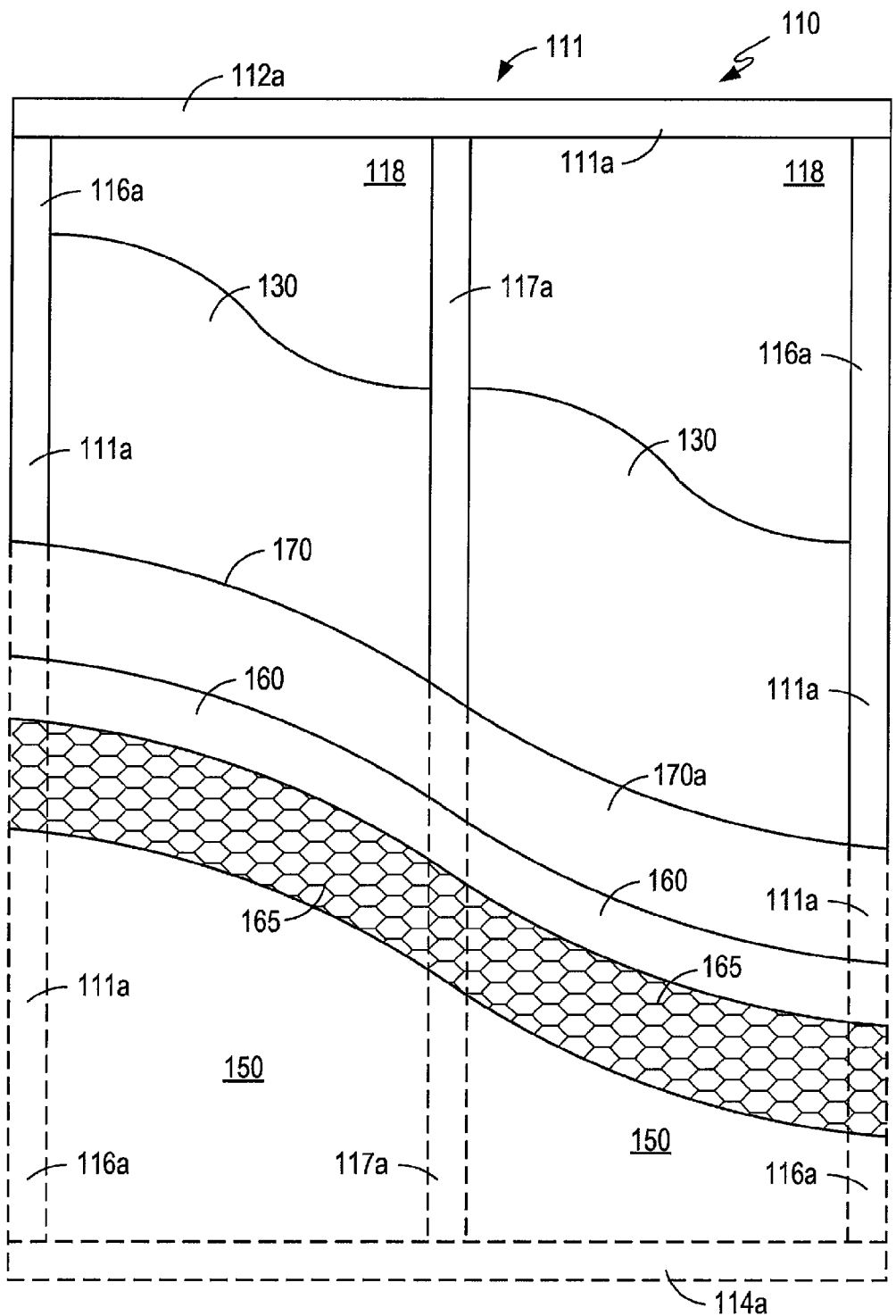
FIG. 2B is a front plan view, partial sectional schematic diagram of the wall structure shown in FIG. 2A.

The reader will appreciate the foregoing features and characteristics, as well as others, upon considering the following detailed description of the inventions according to this specification.

DESCRIPTION

As used in this specification, the term "front" refers to the side, face, or surface of a structure or component oriented towards the outside direction of an exterior wall of a building, and the term "rear" refers to the side, face, or surface of a structure or component oriented towards the inside direction of an exterior wall of a building.

Exterior stucco wall construction typically involves a number of labor intensive steps. For example, an open stud frame is erected on site, (typically with oriented strand board (OSB) shear panels or let-in T-bracing installed at the exterior wall corners), the primary drainage plane is attached to the frame (e.g., a shingled layer of building paper), bond break panels are attached to the frame over the primary drainage plane (e.g., expanded polystyrene (EPS) panels), and a lath is attached to the frame over both the bond break panels and the primary drainage plane. The stucco material is then applied to the lath.

In this typical method of stucco construction, at least three separate sets of fasteners, such as nails and staples, penetrate the various layers and engage the wooden studs of the frame: (1) the fasteners attaching the primary drainage plane to the frame; (2) the fasteners attaching the bond break panels to the frame, which necessarily penetrate through the primary drainage plane; and (3) the fasteners attaching the lath to the frame, which necessarily penetrate through both the bond break panels and the primary drainage plane.

Additionally, in a typical method of stucco construction, preliminary flashing is installed on the sills and jambs of window and door openings before the attachment of the primary drainage plane. Like the primary drainage plane, the bond break panels, and the lath, the preliminary flashing is attached to the frame with fasteners, such as nails and staples, which creates a fourth fastener penetration to the frame near windows, doors, or other flashed penetrations through the exterior wall.

After the installation of the intermediate layers between the frame and the exterior stucco cladding (e.g., the primary drainage plane, the bond break panels, and the lath), the interior side of the frame must be inspected for fasteners that penetrate through the layers but miss the frame and therefore stick-out into the interior of the wall structure. These exposed fasteners create direct pathways for water infiltration and must be sealed-off, for example, by covering with a layer of caulking, before the installation of utility components (e.g., electrical wiring, plumbing, HVAC conduits, etc.), wall cavity insulation (e.g., fiberglass), and interior wall cladding (e.g., drywall).

The multiple sets of fastener penetrations of the various intermediate layers between the frame and the exterior stucco cladding (e.g., the primary drainage plane, the bond break panels, and the lath), create undesirable direct and indirect pathways for water infiltration into the interior portions of the wall. Also, as noted, the typical method of exterior stucco wall construction involves a number of labor intensive steps. Therefore, a new stucco wall structure and method of producing the wall structure that decreases the number of fastener penetrations, and also decreases the number of on-site construction steps, would be advantageous. The wall structure and the method of producing a wall structure described in this specification advantageously decrease both the number of fastener penetrations and the number of on-site construction steps to produce an exterior stucco wall.

As described above, the wall structure comprises a frame, a sheathing board attached to the frame, a foam layer, a bond break layer, a lath layer, and a stucco layer. Referring to FIGS. 1A-3, 5A, and 5B, a wall structure 110 comprises a frame 111. The frame 111 comprises a first member 112, a second member 114 spaced apart from the first member 112, and two side members 116 extending between the first member 112 and the second member 114. The first member 112, the second member 114, and the two side members 116 each comprise a front surface (112a, 114a, and 116a, respectively) and a rear surface (112b, 114b, and 116b, respectively) that collectively form a front frame surface 111a and a rear frame surface 111b. The constituent members (112, 114, and 116) of the frame 111 can be made out of a suitable material of construction such as wood. For example, the constituent members (112, 114, and 116) of the frame 111 can comprise wooden 2×4 members (i.e., structural members made of wood having nominal thicknesses of about 2-inches, nominal widths of about 4-inches, and suitable lengths) secured together with fasteners such as nails, nail plates, screws, staples, bolts, or rivets, or a combination of any thereof.

As shown in FIGS. 1A-3, 5A, and 5B, the frame 111 further comprises a primary support member 117, which comprises a front surface 117a and a rear surface 117b. The front surface 117a and the rear surface 117b correspond to the front frame surface 111a and the rear frame surface 111b. It is understood, however, that a wall structure and/or a frame can omit any primary support members or include any number of primary support members. Additionally, if a wall structure and/or a frame includes one or more primary support members, the front surface and the rear surface of any primary support member may or may not correspond to the front frame surface and the rear frame surface, respectively.

Figure 4:
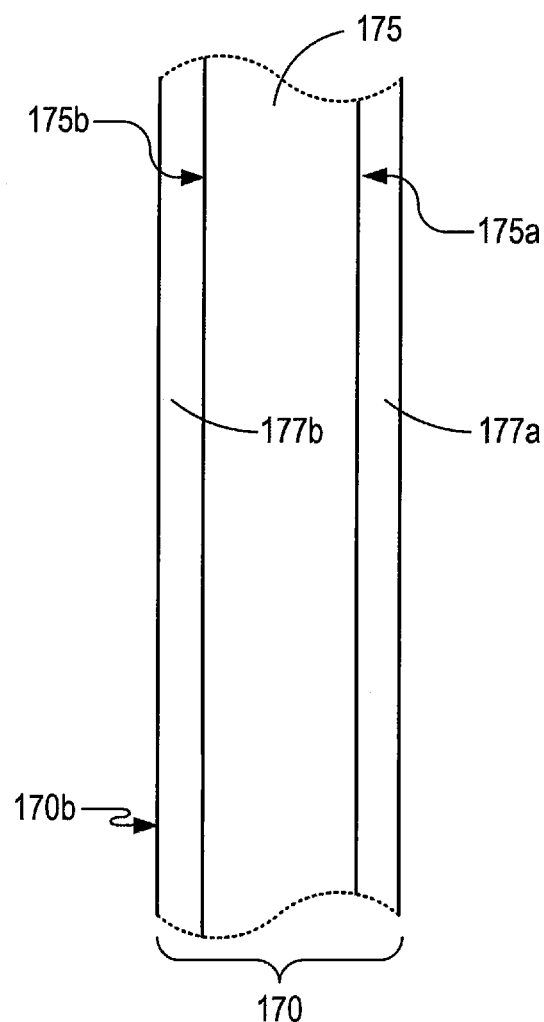
FIG. 4 is a side cross-sectional schematic diagram of a sheathing board comprising a polyisocyanurate foam layer and facer materials attached to a front face and a rear face of the polyisocyanurate foam layer.

A sheathing board 170 is attached to the front frame surface 111a. As used in this specification, the term "sheathing board" refers to a board comprising either extruded polystyrene (XPS) or polyisocyanurate. For example, referring to FIG. 4, the sheathing board 170 can comprise a polyiso board comprising a polyisocyanurate foam layer 175 and a facer material 177a/177b attached to a front face 175a and/or a rear face 175b of the polyisocyanurate foam layer 175. Although FIG. 4 shows facer materials 177a and 177b respectively attached to both the front face 175a and the rear face 175b of the polyisocyanurate foam layer 175, it is understood that a sheathing board can comprise a facer material attached to just the front face of a polyisocyanurate foam layer. Additionally, although FIG. 4 shows a polyiso board comprising a polyisocyanurate foam layer, it is understood that a board comprising extruded polystyrene can also comprise additional facers materials, as described below.

In implementations in which the sheathing board comprises a polyiso board, the sheathing board generally meets the requirements of ASTM C1289-15: Standard Specification for Faced Rigid Cellular Polyisocyanurate Thermal Insulation Board, which is incorporated-by-reference into this specification. Polyiso boards generally comprise facer materials attached to and covering both sides (the front and rear faces) of a polyisocyanurate foam layer. For example, facer materials can comprise glass mats filled with recycled cardboard and colored with carbon black. Facers materials can also comprise foil or foil/glass composites. Facer materials can also comprise fibrous materials such as fiberglass materials or other fiber-reinforced sheet-like materials. Examples of suitable facer materials include, but are not limited to, fiberglass mats, glass fiber-reinforced cellulosic felts, coated and polymer-bonded fiber mats (e.g., fibrous glass mats bonded with an organic polymer binder and coated with an organic polymer coating, clay, or other inorganic coating), foils (e.g., aluminum foil), coated foils, foil/membrane laminates, foil/glass composites, and polyolefin films (such as TYVEK® materials, available from DuPont; or TYPAR® materials, available from Fiberweb, Inc.).

If a sheathing board comprises facer materials on both the front and rear faces of the polyisocyanurate foam layer, then the facer material on the front face may be the same as or may be different than the facer material on the rear face. The facer materials should meet the requirements described in ASTM D226/D226M-09: Standard Specification for Asphalt-Saturated Organic Felt Used in Roofing and Waterproofing; or ASTM E2556/E2556M-10: Standard Specification for Vapor Permeable Flexible Sheet Water-Resistive Barriers Intended for Mechanical Attachment; or otherwise qualify as a water-resistive barrier in accordance with International Residential Code (IRC) 703.2 (2012), which are each incorporated-by-reference into this specification. In implementations in which the sheathing board comprises a polyiso board, the front facer material functions as a primary drainage plane for the wall structure; and in implementations in which the sheathing board comprises an extruded polystyrene board, the front-facing surface of the XPS board (or any optional front facer material) functions as a primary drainage plane for the wall structure.

Referring again to FIGS. 1A-3, the sheathing board 170 may be attached to the front frame surface 111a. The sheathing board 170 can be attached to any of the front faces (112a, 114a, 116a, and/or 117a) of the constituent members (112, 114, 116, and 117) of the frame 111. For example, the sheathing board 170 can be attached to the front faces 112a and 114a of the first and second members 112 and 114, and to the front faces 116a of the two side members 116. The sheathing board 170 also can be attached to the front face 117a of the primary support member 117. The sheathing board 170 can be attached to the front frame surface 111a with fasteners and/or an adhesive (not shown). Attachment fasteners can include, but are not limited to, nails, staples, screws, bolts, or rivets, or a combination of any thereof. Attachment adhesives can comprise a construction adhesive that is compatible with the adjoining materials. For example, an adhesive used to attach a sheathing board to a frame can comprise a foam material (which may be the same foam material or a different foam material as the foam material comprising the foam layer, described below).

The sheathing board, the first member 112, the second member 114, the two side members 116, and the primary support member 117 define cavities 118 within the frame 111. Foam layers 130 are located within the cavities 118. The foam layers 130 adhere to the rear-facing surface 170b of the sheathing board 170. If a wall structure omits a primary support member, then the sheathing board, the first and second members, and the two side members can define one cavity within the frame, and a foam layer can be located in the cavity. If a wall structure includes two or more primary support members, then the sheathing board, the first and second members, the two side members, and the plurality of primary support members can define three or more cavities within the frame and foam layers can be located in the plurality of cavities (see, e.g., FIGS. 10A-13).

The foam layer 130 (and, optionally, any foam-based adhesive used to attach the sheathing board 170 to the frame 111) can comprise, for example, polyurethane or polyisocyanurate, or mixtures thereof. The foam layer 130 can be substantially free, essentially free, or completely free of halogen-containing flame retardant additives.

As used in this specification, the term "foam" refers to a substance that is formed by trapping pockets of gas in a liquid or solid. A foam layer can comprise a closed-cell foam, wherein the term "closed-cell foam" refers to foam that contains discrete, non-interconnecting cells formed by the trapped pockets of gas. Examples of foam materials include, but are not limited to, foams made with polyurethane, polyisocyanurate (also referred to as polyiso), and mixtures thereof. Foam materials (including the foam layer 130) may be substantially free, may be essentially free, or may be completely free of halogen-containing flame retardant additives. The term "halogen" refers to the halogen elements, which include fluorine, chlorine, bromine, and iodine, and the term "halogen-containing flame retardant additives" refers to a substance that may be used to inhibit or resist the spread of fire, and which contains halogen groups such as a fluoro, chloro, bromo, and/or iodo groups. Further, the term "substantially free," as used in this specification, means the foam material contains less than 1000 parts per million (ppm), "essentially free" means less than 100 ppm, and "completely free" means less than 20 parts per billion (ppb) of halogen-containing flame retardant additives.

Figure 3:
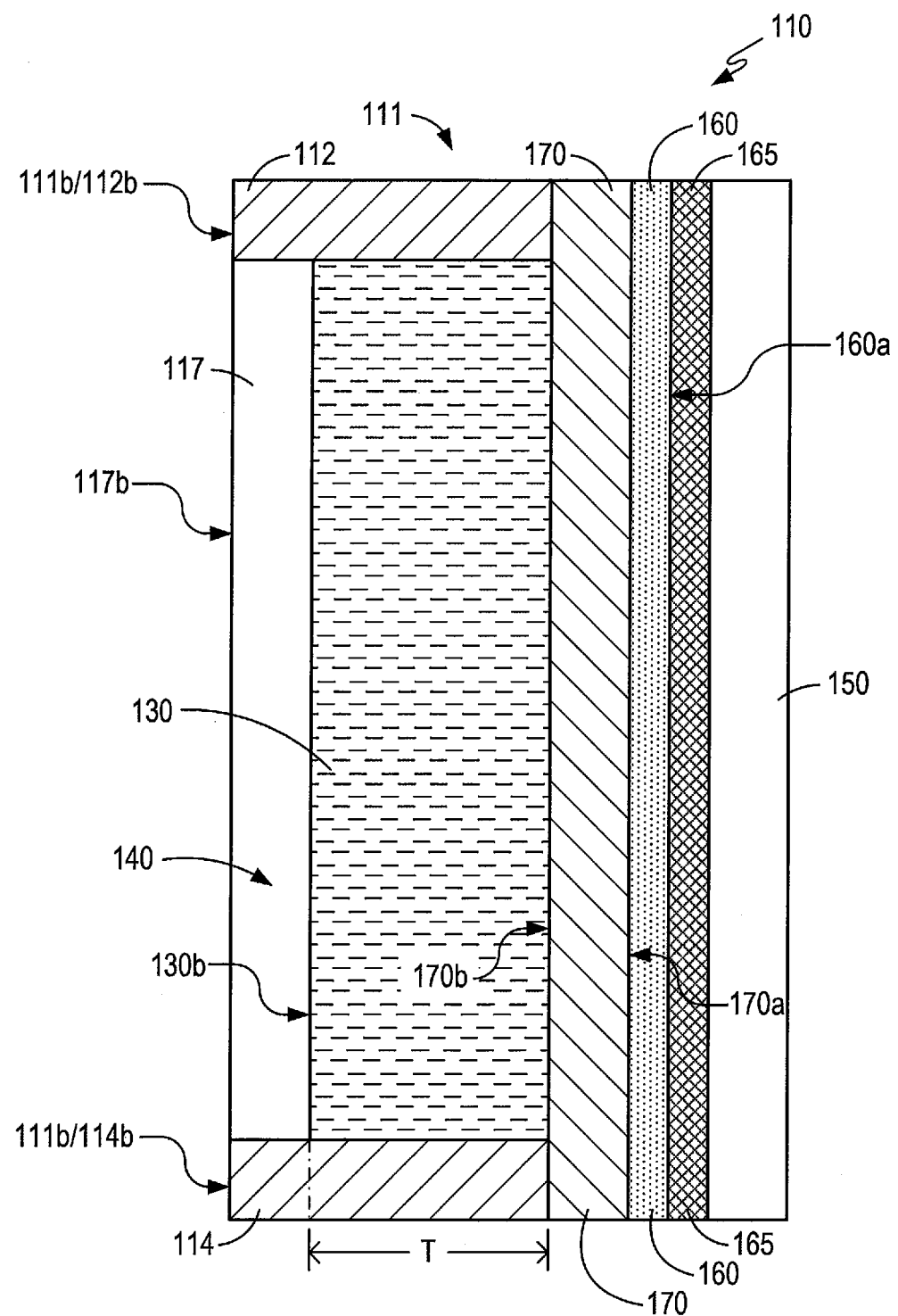
FIG. 3 is a side cross-sectional schematic diagram of the wall structure shown in FIGS. 1A-2B.

Referring to FIG. 3, the foam layer 130 comprises a thickness T extending from the rear-facing surface 170b of the sheathing board 170 to a position intermediate the front frame surface 111a and the rear frame surface 111b. In this manner, a gap 140 may be formed within the frame 111 between a rear-facing surface 130b of the foam layer 130 and the rear frame surface 111b. The gap 140 in the wall structure 110 can be used to accommodate electrical wiring, electrical fixtures such as outlet boxes, plumbing, HVAC conduits, or other utility components incorporated into the wall structure. Alternatively, although FIG. 3 shows the foam layer 130 comprising a thickness T extending from the rear-facing surface 170b of the sheathing board 170 to a position intermediate the front frame surface 111a and the rear frame surface 111b, it is understood that the foam layer 130 can alternatively comprise a thickness extending from the rear-facing surface 170b of the sheathing board 170 to the rear frame surface 111b, in which case no gap is formed within the frame 111 between the rear-facing surface 130b of the foam layer 130 and the rear frame surface 111b.

A bond break layer 160 is located adjacent to the front facing surface 170a of the sheathing board 170. A lath layer 165 is located adjacent to the bond break layer 160.

The bond break layer 160 can comprise a material that does not readily adhere to the underlying surface of the sheathing board, which, as described above, functions as the primary drainage plane for the wall structure. The bond break layer 160 can comprise a material layer such as, for example, an asphalt-impregnated kraft paper (30-minute or 60-minute), an asphalt-impregnated felt paper (30-minute or 60-minute), an extruded polystyrene (XPS) layer, an expanded polystyrene (EPS) layer, a polyiso layer, a polyethylene sheet or film, a polypropylene sheet or film, a poly(vinyl chloride) sheet or film, a woven house wrap, a perforated housewrap, a nonmoven and spunbonded polyolefin sheet or film (e.g., TYVEK® materials, available from DuPont; or TYPAR® materials, available from Fiberweb, Inc.), a woven and perforated polyolefin sheet or film (e.g., WEATHERMATE housewrap, available from The Dow Chemical Company), a layer comprising a three-dimensional matrix of randomly-oriented extruded polymer filaments (e.g., SLICKER® materials, available from Benjamin Obdyke Inc., which are sheets comprising a three-dimensional matrix of randomly-oriented extruded polycaprolactam (nylon 6) filaments), or a fiberboard (e.g., adhesive-bonded and laminated cellulosic fiberboards (e.g., Thermo-Ply® boards, available from OX Engineered Products), asphalt-impregnated cellulosic fiberboards (e.g., Celotex® boards, available from Blue Ridge Fiberboard), or thermoset resin-wood composite boards (e.g., low-density fiberboard (particle board) and medium-density fiberboard)).

In one example, the bond break layer 160 comprises a Grade D 60-minute building paper (e.g., U.S. Federal Supply Service, General Services Administration, Federal Specification UU-B-790a, Type I-Barrier paper, Grade D-Water vapor permeable, Style 2-Uncreped, not reinforced, saturated). Grade D 60-minute building paper generally comprises an asphalt-saturated kraft-type paper having a water resistance rating of at least 60-minutes determined according to ASTM D779-03: Standard Test Method for Water Resistance of Paper, Paperboard, and Other Sheet Materials by the Dry Indicator Method, which is incorporated-by-reference into this specification.

The bond break layer 160 can be positioned adjacent to the front facing surface 170a of the sheathing board 170 and attached to the frame 111 using fasteners such as staples, screws, ring clips, or nails, for example. The bond break layer 160 can be positioned on the sheathing board 170 and attached to the frame 111 in a shingled fashion, beginning at the bottom of the wall structure, so that horizontally-positioned rows of bond break material have a vertical overlap along the horizontal width of the wall structure (see overlap regions 169 in FIG. 6C).

The lath layer 165 can comprise a steel wire lath. For example, the lath layer 165 can comprise a galvanized steel or stainless steel, 17-gauge or 20-gauge, wire mesh lath. A steel wire lath layer can be self-furred. As used in this specification, the term "self-furred" means that the lath pulls away from the underlying bond break layer by a sufficient distance to allow applied stucco material to key into the lath layer and embed the wire into the overlying stucco material. Self-furred wire laths can be produced, for example, by crimping, dimpling, grooving, or otherwise deforming the mesh in discrete locations to ensure that a gap forms between the lath layer and the underlying bond break layer when the lath layer is positioned adjacent to the bond break layer. The gap between a self-furred steel wire lath and the underlying bond break layer provides space for applied stucco material to key into the mesh structure, embedding the wire into the overlying stucco material. In this manner, stucco material applied onto a lath layer comprising a self-furred steel wire lath integrates into the lath layer and forms a wire-reinforced stucco layer.

The lath layer 165 can be positioned adjacent to the bond break layer 160 and attached to the frame 111 using fasteners such as staples, screws, ring clips, or nails, for example. The lath layer 165 can be positioned over the bond break layer 160 and attached to the frame 111 in a shingled fashion, beginning at the bottom of the wall structure, so that horizontally-positioned rows of lath material have a vertical overlap along the horizontal width of the wall structure (see overlap regions 169 in FIG. 6C). The lath layer can be positioned over the bond break layer and attached to the frame in accordance with ASTM C1063-15: Standard Specification for Installation of Lathing and Furring to Receive Interior and Exterior Portland Cement-Based Plaster, which is incorporated-by-reference into this specification.

The bond break layer 160 and the lath layer 165 can be bonded together and the pre-bonded combination attached to the frame 111 simultaneously. In this manner, the pre-bonded combination of the bond break layer 160 and the lath layer 165 can be positioned on the front-facing surface 170a of the sheathing board 170 and attached to the frame 111 with one set of fasteners (e.g., nails, staples, ring clips, or screws, or a combination of any thereof) that penetrate through the sheathing board 170 and into the frame 111. The pre-bonded combination of the bond break layer 160 and the lath layer 165 can comprise any of the bond break layer materials described above. For example, the pre-bonded combination of the bond break layer 160 and the lath layer 165 can comprise a paper-backed metal wire lath, wherein the bond break layer comprises a Grade D 60-minute building paper (or other building paper) and the metal wire lath comprises a self-furred steel wire lath. The bond break layer 160 and the lath layer 165 can be bonded together, for example, with an interpenetrating wire and/or an adhesive.

Figure 8:
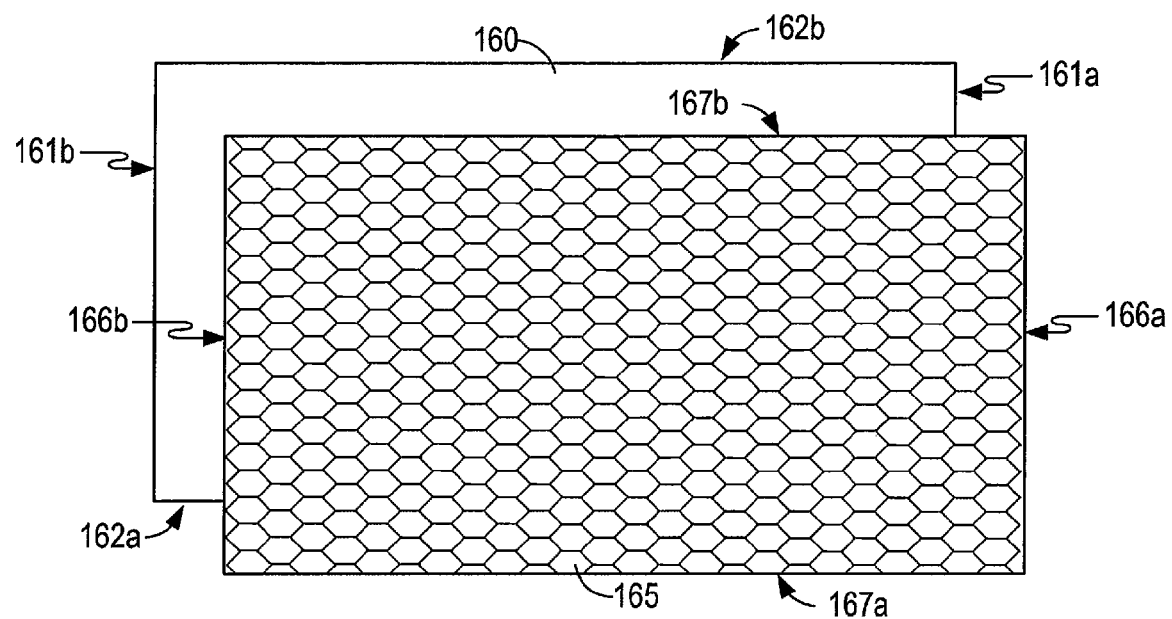
FIG. 8 is a side view schematic diagram of a bonded combination of a bond break layer and an offset lath layer.

In one implementation, the bond break layer 160 and the lath layer 165 can comprise a paper-backed metal wire lath (e.g., a self-furred steel wire lath bonded to a Grade D 60-minute building paper with an interpenetrating wire and/or an adhesive) wherein the lath layer 165 is offset on the bond break layer 160. For example, referring to FIG. 8, the lath layer 165 is offset on the bond break layer 160 so that two perpendicular edges of the overlying lath layer 165 (a short edge 166a and a long edge 167a) overhang the corresponding edges (161a and 162a) of the underlying bond break layer 160, and two perpendicular edges of the underlying bond break layer 165 (a short edge 161b and a long edge 162b) overhang the corresponding edges (166b and 167b) of the overlying lath layer 165. The overhanging portions of the lath layer 165 and the bond break layer 160 facilitate the positioning of the paper-backed metal wire lath on the exterior-facing surface of the sheathing board in a shingled fashion, beginning at the bottom of the wall structure, so that horizontally-positioned rows of paper-backed metal wire lath have a vertical overlap along the horizontal width of the wall structure (see overlap regions 169 in FIG. 6C).

Still referring to FIGS. 1A-3, stucco layer 150 is integrated into the lath layer 165. As noted above, the lath layer 165 can comprise a self-furred steel wire lath, which provides space for applied stucco material to key into the mesh structure, embedding the wire into the overlying stucco, and thereby integrating the stucco material into the lath layer and forming a wire-reinforced stucco layer. Although not shown, the stucco layer 150 can comprise one, two, three, or more separately-applied layers of stucco material. For example, the stucco layer 150 can comprise two separately-applied stucco layers: (1) a brown coat integrated into the lath layer; and (2) a finish coat applied onto the brown coat. As an alternative example, the stucco layer 150 can comprise three separately-applied stucco layers: (1) a scratch coat integrated into the lath layer; (2) a brown coat applied onto the scratch coat; and (3) a finish coat applied onto the brown coat.

A method for producing a wall structure as described above can comprise providing a wall panel, attaching a bond break layer and a lath layer to the wall panel (either separately or as a pre-bonded combination), and applying a stucco layer integrated into the lath layer. The wall panel can comprise a frame comprising a first member, a second member spaced apart from the first member, and two side members extending between the first member and the second member. The first member, the second member, and the two side members each comprise a front surface and a rear surface that form a front frame surface and a rear frame surface, and a sheathing board is attached to the front frame surface. The sheathing board can comprise an extruded polystyrene board or a polyiso board comprising a polyisocyanurate foam layer and a facer material attached to at least the front face of the polyisocyanurate foam layer. The sheathing board, the first and second members, and the two side members define a cavity within the frame, and a foam layer is located within the cavity and adhered to the rear-facing surface of the sheathing board. Wall panels can be provided in pre-fabricated form as described, for example, in U.S. Patent Application Publication No. 2015/0093535 A1, which is incorporated-by-reference into this specification.

Figure 7A:
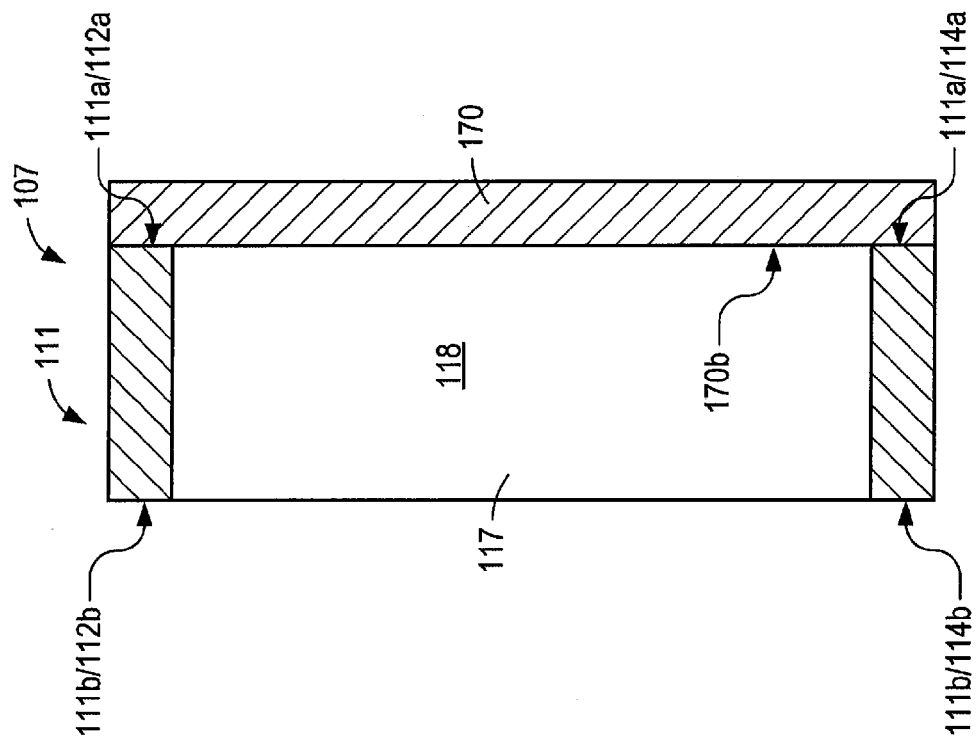
Figure 6A:
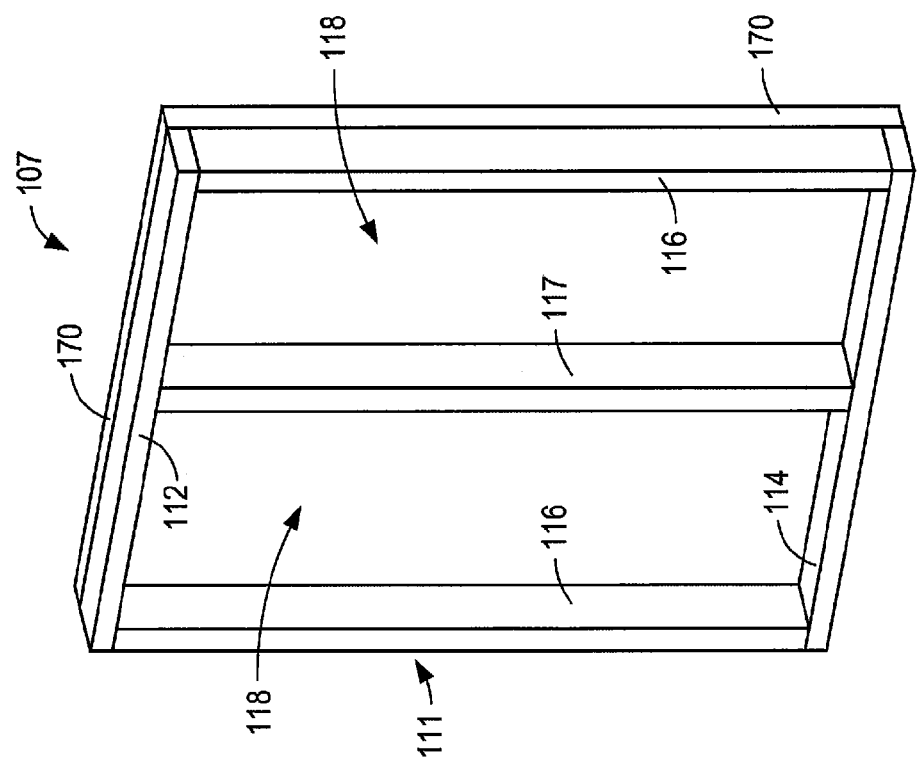
Figure 7B:
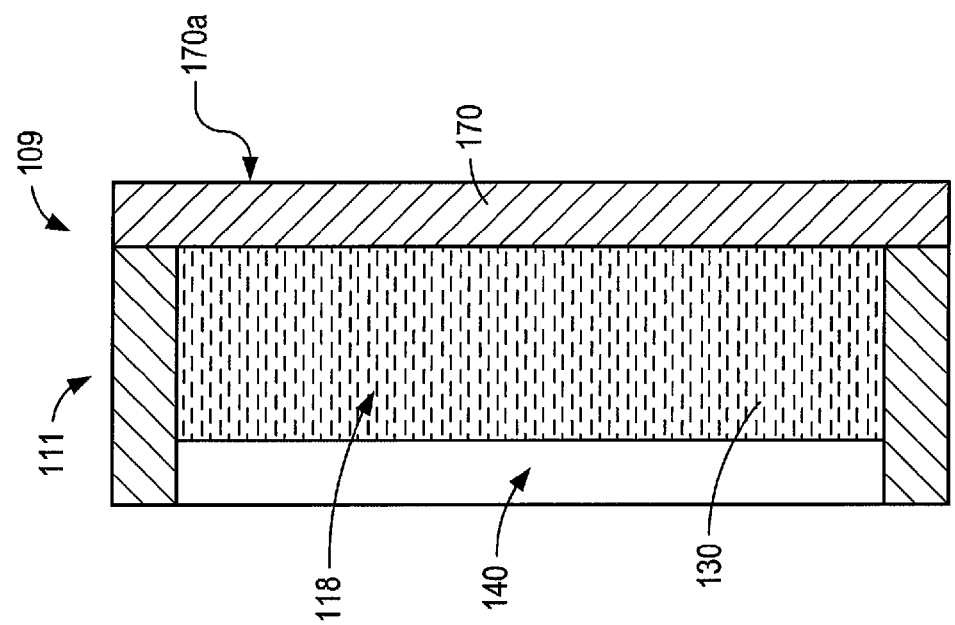
Figure 6B:
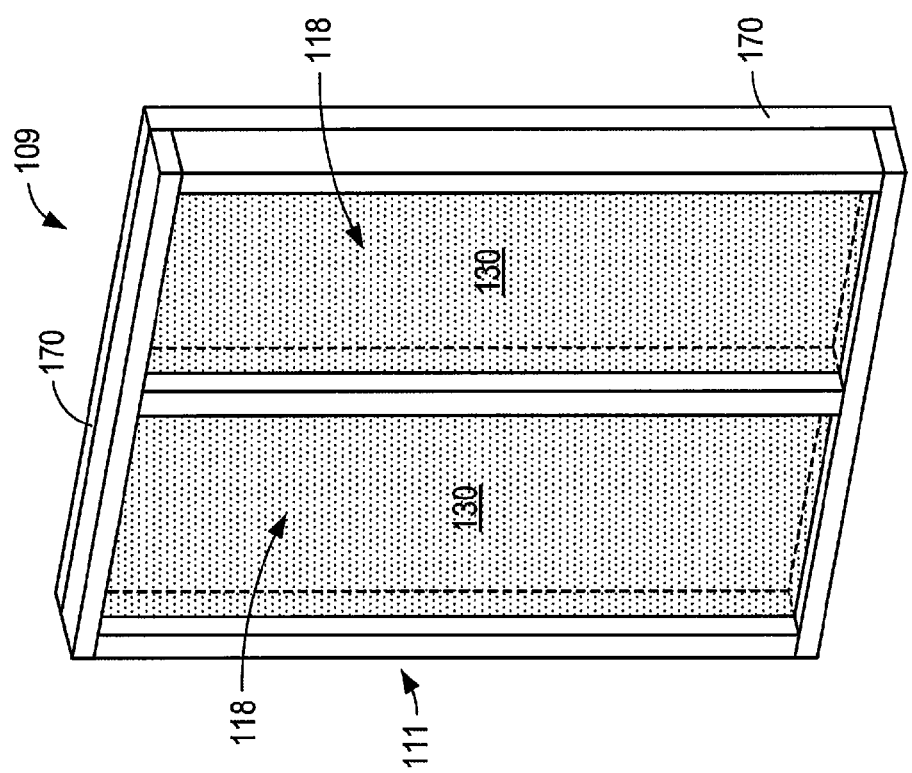

FIGS. 6A-6B and 7A-7B illustrate the pre-fabrication of a wall panel 109. Referring to FIGS. 6A and 7A, a partially-complete wall panel 107 comprises a frame 111 and a sheathing board 170 attached to the front frame surface 111a. The constituent members of the frame 111 (i.e., members 112, 114, 116, and 117) define cavities 118 in the frame 111. Referring to FIGS. 6B and 7B, foam layers 130 are deposited in the cavities 118 in the frame and adhere to the sheathing board 170. The frame 111, the attached sheathing board 170, and the deposited foam layers 130 collectively form the wall panel 109.

Figure 7C:
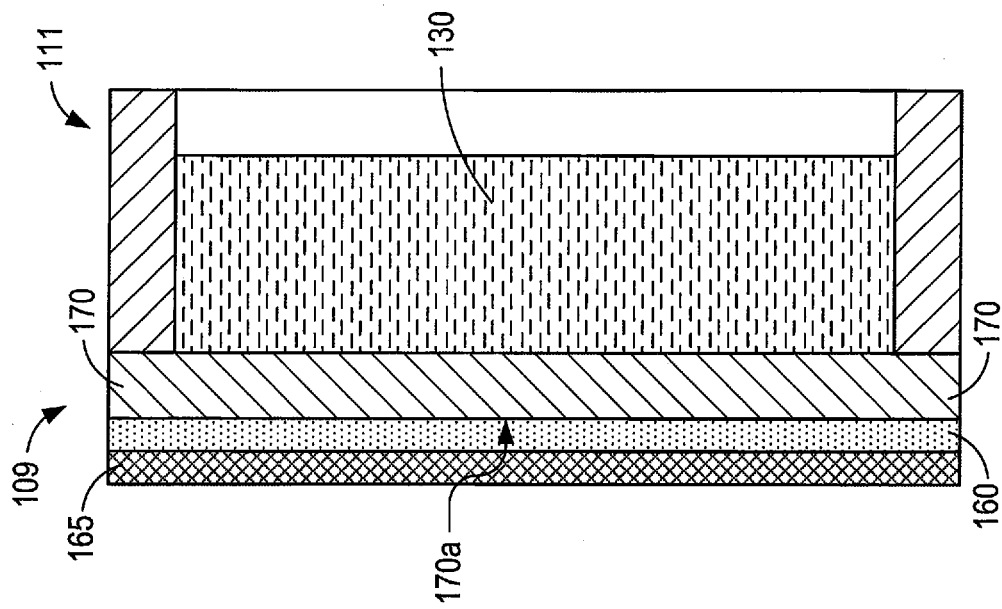
Figure 6C:
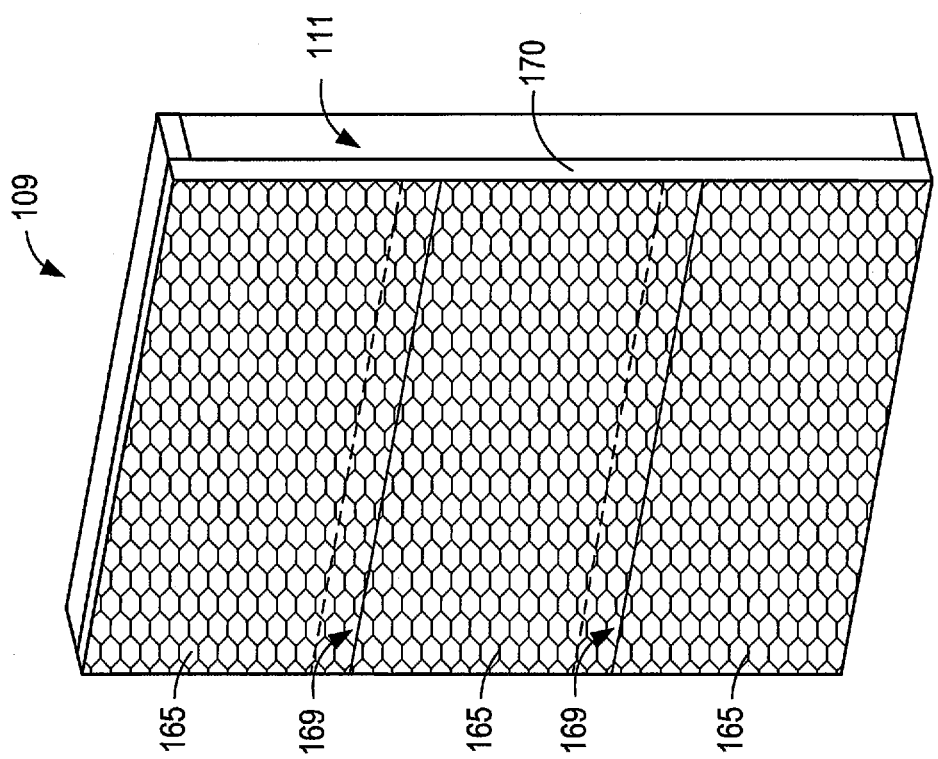

FIGS. 6C-6E and 7C-7E illustrate a method for producing a wall structure. Referring to FIGS. 6C and 7C, a bond break layer 160 and a lath layer 165 are positioned adjacent to the front-facing surface 170a of the sheathing board 170 of the wall panel 109. As described above, the bond break layer 160 and the lath layer 165 can be positioned on the sheathing board 170 and attached to the frame 111 either sequentially as separately-applied layers or simultaneously as a pre-bonded combination (e.g., as a paper-backed metal wire lath). In either option, the bond break layer 160 can comprise, for example, a Grade D 60-minute building paper or any of the other materials described above, and the lath layer 165 can comprise a self-furred steel wire lath. If the bond break layer 160 and the lath layer 165 are pre-bonded together, then the pre-bonded combination of the bond break layer 160 and the lath layer 165 can be simultaneously positioned adjacent to the front-facing surface 170a of the sheathing board 170 and attached to the frame 111 with one set of fasteners that penetrate through the sheathing board.

Referring to FIGS. 6D and 7D, the stucco layer 150 is applied onto the lath layer 165. As described above, the stucco layer 150 is integrated into the lath layer 165. For example, the lath layer 165 can comprise a self-furred steel wire lath, which provides space for the applied stucco material to key into the mesh structure, embedding the wire into the overlying stucco layer, and thereby integrating the stucco layer into the lath layer and forming a wire-reinforced stucco layer. Although not shown, the stucco layer 150 can be applied as one, two, three, or more separately-applied layers of stucco material. For example, the application of the stucco layer 150 can comprise the separate application of: (1) a brown coat applied onto the lath layer; and (2) a finish coat applied onto the brown coat. As an alternative example, the application of the stucco layer 150 can comprise the separate application of: (1) a scratch coat integrated into the lath layer; (2) a brown coat applied onto the scratch coat; and (3) a finish coat applied onto the brown coat.

Figure 7E:
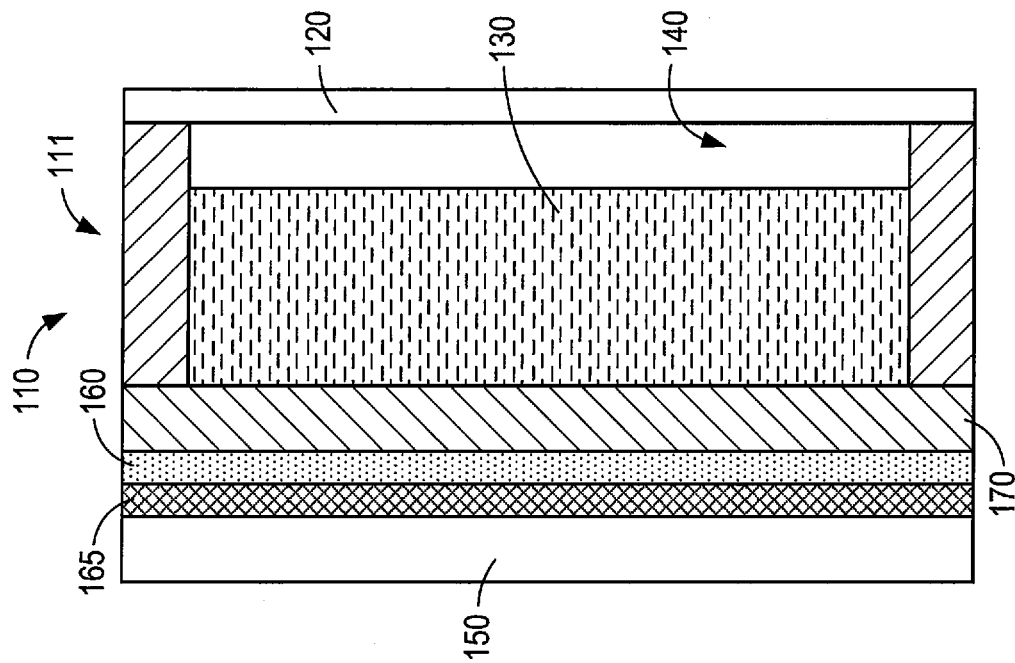
Figure 6E:
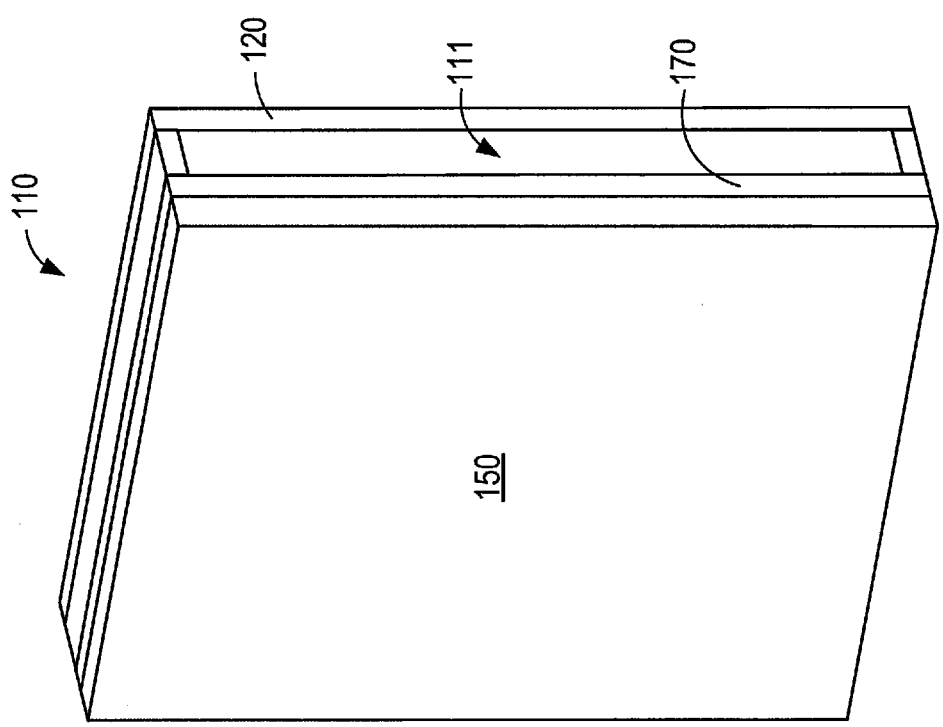

Referring to FIGS. 6E and 7E, an interior wall cladding material 120 (e.g., drywall, plaster board, wood paneling, composite paneling, or other inside wall cladding material) can be applied and attached to the rear-facing surface 111a of the frame 111. A gap 140 is shown located between the foam layer 130 and an interior wall cladding 120, but it is understood that, alternatively, the foam layer can fill the space between the sheathing board and the interior wall cladding.

For ease of illustration, FIGS. 6C-6E illustrate the production of a wall structure 110 comprising one wall panel 109. However, it is understood that the wall structures described in this specification can comprise any number of separate wall panels joined together to form the wall structure. For example, referring to FIGS. 6B and 7B, any number of wall panels 109 can be provided at a building site (e.g., delivered to the building site) and assembled into an incomplete exterior wall structure. The incomplete exterior wall structure comprising multiple wall panels can be assembled on and attached to a building foundation. A roof structure can be installed on the incomplete exterior wall structure. A bond break layer and a lath layer, as described above, can be applied to the incomplete exterior wall structure covering the multiple assembled wall panels. A stucco layer can be applied onto and integrated into the lath layer over the multiple assembled wall panels to complete the exterior-facing surface of the wall structure.

Additionally, the production of a wall structure comprising multiple assembled wall panels can comprise the installation of additional stucco cladding components such as, for example, corner beads, weep screeds, control joints, and expansion joints.

FIGS. 9A-15 illustrate additional features of the wall panels used to produce the wall structures described in this specification. For example referring to FIGS. 10A and 10B, a wall panel 10 includes a frame 11, at least one primary support member 17, a sheathing board 70, and a foam layer 30. As shown in FIGS. 9A and 9B, the frame 11 may be defined by a first member 12, a second member 14 spaced apart from the first member 12, and two side members 16 extending between the first member 12 and the second member 14. The first member 12, the second member 14, and the two side members 16 each have a front surface 12a, 14a, 16a and a rear surface 12b, 14b, 16b that define a front frame surface 11a and a rear frame surface 11b, respectively.

The frame 11 can be constructed into different shapes depending on its intended use in the production of a stucco wall structure. For example, as shown in FIGS. 9A and 9B, the frame 11 can be constructed as a conventional industry standard rectangular or square frame 11. The first member 12 and the second member 14 may be spaced apart and extend parallel to each other, and the two side members 16 may extend perpendicular to the first member 12 and the second member 14 so as to from a rectangular or square frame 11. The shape and design of the frame 11 is not so limited and can be constructed into any desired shape. Generally, the shape and design of the frame 11 is constructed in accordance with the floor plans designed for a particular home or building.

Referring to FIGS. 10A and 10B, at least one primary support member 17 may be positioned between the two side members 16. The primary support members 17 may extend between the first member 12 and the second member 14. The primary support members 17 may define a front primary support surface 17a and a rear primary support surface 17b. As shown in FIGS. 10A and 10B, the front primary support surface 17a and the rear primary support surface 17b correspond to the front frame surface 11a and the rear frame surface 11b of the frame 11. The primary support members 17 may be spaced apart to form cavities 18. The cavities 18 may be defined by the space formed within the frame 11 between the primary support members 17, the side members 16, the first member 12, and/or the second member 14. The size of each cavity 18 can vary based on the size of the frame 11, the distance between consecutively positioned primary support members 17, and the number of primary support members 17 present. The primary support members 17, the side members 16, the first member 12, and/or the second member 14 may comprise one or more plates, boards, beams, studs, or the like. For example, as shown in FIGS. 9A-10B, the first member 12 may include two beams.

The two side members 16 and/or the primary support members 17 may be fixedly engaged to the first member 12 and the second member 14. For example, the two side members 16 and/or the primary support members 17 may be fixedly engaged to the first member 12 and the second member 14 with fasteners. Suitable fasteners include, but are not limited to, nails, nail plates, staples, bolts, screws, and rivets. The first member 12, the second member 14, the two side members 16, and the primary support members 17 can be made of various materials. For example, the first member 12, the second member 14, the two side members 16, and the primary support members 17 can be made of wood, metal, fiberglass, plastic, wood-polymer composite materials, or a combination of any thereof. The first member 12, the second member 14, the two side members 16, and the primary support members 17 can be made of the same material or different materials.

The dimensions of the first member 12, the second member 14, the two side members 16, and the primary support members 17 can vary depending on the intended use of the frame 11. The first member 12, the second member 14, the two side members 16, and the primary support members 17 can each have any dimension. The first member 12, the second member 14, the two side members 16, and the primary support members 17 can have the same dimensions. For example, the first member 12, the second member 14, the two side members 16, and the primary support members 17 may have the same thickness and width dimensions, and the same or different length dimensions. For example, the first member 12, the second member 14, the two side members 16, and the primary support members 17 can all have a thickness and width and height dimension of nominally 2×4 inches. In another example, the first member 12, the second member 14, the two side members 16, and the primary support members 17 can all have thickness and width dimensions of nominally 2×6 inches.

The first member 12, the second member 14, and the two side members 16 can have the same dimensions, which may be different than the dimensions of the primary support members 17. For example, the first member 12, the second member 14, and the two side members 16 may have the same thickness and width dimensions, and the primary support members 17 may have thickness and/or width dimensions that may be different than the dimensions of the first member 12, the second member 14, and the two side members 16. For example, the first member 12, the second member 14, and the two side members 16 can have thickness and width dimensions of nominally 2×6 inches, and the primary support members 17 can have thickness and width dimension of nominally 2×4 inches.

Figures 11, 12:
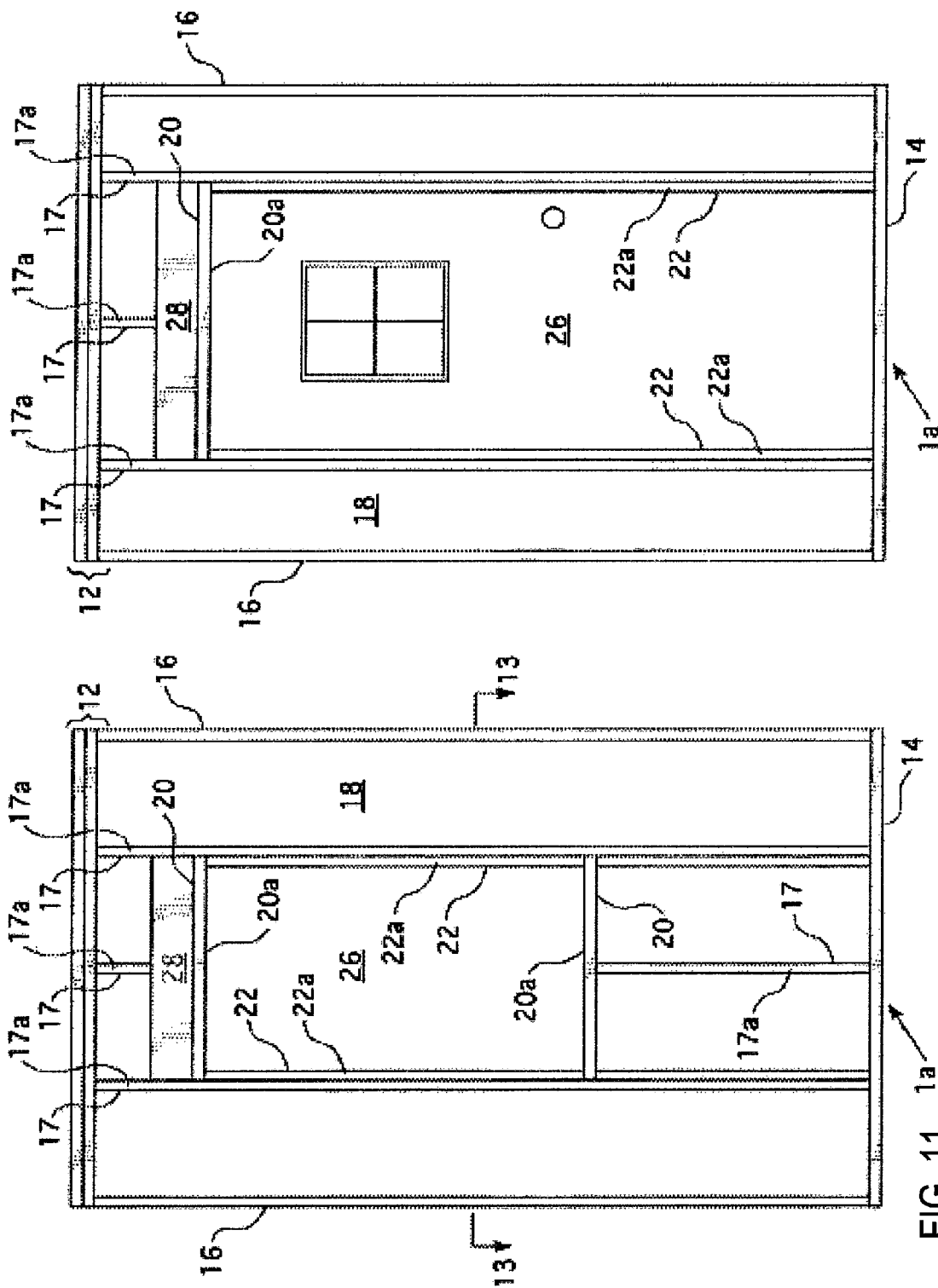
FIG. 11 is a front view of a wall panel frame with a window opening.
FIG. 12 is a front view of a wall panel frame with a door.

Referring to FIGS. 11 and 12, a wall structure can comprise one or more secondary support members 20, and/or tertiary support members 22. The secondary support members 20 and the tertiary support members 22 may comprise one or more plates, boards, beams, studs, or the like. The secondary support members 20 and the tertiary support members 22 can be incorporated into the frame 11 to provide additional structural support, for example, to form spaces for windows, doors, and the like. The secondary support members 20 and the tertiary support members 22 can have dimensions that are the same as or different than the primary support members 17, the side members 16, the first member 12, and/or the second member 14. For example, the secondary support member 20 and the tertiary support members 22 can have shorter lengths than the primary support members 17, the side members 16, the first member 12, and/or the second member 14.

As shown in FIGS. 11 and 12, the secondary support members 20 may have a front secondary support surface 20a and a rear secondary support surface (not shown) that correspond with the front and rear frame surfaces 11a and 11b, and the front and rear primary support surfaces 17a and 17b. Similarly, the tertiary support members 22 may have a front tertiary support surface 22a and a rear tertiary support surface 22b (see FIG. 27) that correspond with the front and rear frame surfaces 11a and 11b and the front and rear primary support surfaces 17a and 17b.

The secondary support members 20 extend between and attach to the primary support members 17, or alternatively, the secondary support members 20 extend between and attach to a primary support member 17 and a side member 16. The tertiary support members 22 extend between two secondary support members 20 or between a secondary support member 22 and the first member 12 and/or the second member 14.

The secondary support members 20, the tertiary support members 22, the primary support members 17, the side members 16, the first member 12, and/or the second member 14 form a secondary cavity 26. As shown in FIGS. 11 and 12, the secondary cavity 26 can be used as a space for a window, a door, or any other opening. For example, the secondary support members 20, the tertiary support members 22, the primary support members 17, the side members 16, the first member 12, and the second member 14 can be constructed as a conventional industry standard rectangular or square wall panel having a window, door, or any other opening. For example, referring to FIG. 11, a rectangular or square wall structure having a window can be formed as follows: a first member 12 and a second member 14 may be spaced apart and extend parallel to each other; two side members 16 may extend between the first member 12 and the second member 14 in a direction perpendicular to the first member 12 and the second member 14; primary support members 17 may be positioned between the side members 16 and extend between the first member 12 and the second member 14 in a direction perpendicular to the first member 12 and the second member 14; two secondary support members 20 may be spaced apart and extend between the primary support members 17 in a direction parallel to the first member 12 and the second member 14; and two tertiary support members 22 may be spaced apart and extend between the two secondary members 20 in a direction perpendicular to the secondary support members 20 and the first member 12 and the second member 14. In addition, the primary support members 17 can also extend between the secondary members 20 and the first member 12 and/or the second member 14. As shown in FIG. 11, a secondary cavity 26 may be formed between the secondary support members 20 and the tertiary support members 22. The resulting rectangular or square wall panel can be used in a residential home or building. The shape and design of the frame 11 of the wall panel 10 is not so limited and can assume any shape and design as desired.

Additional support members and structural elements may also be used depending on the intended use of the wall panel 10. For example, and as shown in FIGS. 11 and 12, a header 28 may be used to provide additional support for a door or window. Other additional support members may be used for structural purposes, design purposes, and the like.

Referring to FIGS. 13, 14A, and 14B, a sheathing board 70 may be attached to at least a portion of the front frame surface. As described above, the sheathing board can comprise an extruded polystyrene board or a polyiso board comprising a sheet or slab or section comprising polyisocyanurate-modified polyurethane foam (i.e., a polyisocyanurate foam layer). Polyiso boards can also comprise facer materials, as described above, located on the rear face and/or front face of the polyisocyanurate foam layer. Compared to polyurethane foams, polyiso foams have a much higher isocyanate content. Through the use of certain catalysts the isocyanate is able to react with itself forming a ring-like structure (polyisocyanurate) that is very stable. Sheathing boards (La, XPS boards and polyiso boards) typically have a thickness which varies depending on the application. For example, a sheathing board can have a thickness of about ½-inch to about 3-inches, or any sub-range subsumed therein such as, for example, about ¾-inch to about 2-inches.

The sheathing board may be attached to the front frame surface by various attachment mechanisms. For example, the sheathing board can be attached to the front frame surface by fasteners. The fasteners used to attach the sheathing board to the front frame surface are not necessarily the same as the fasteners used to engage the first and second members, as described above. Suitable fasteners may include nails, staples, screws, bolts, or rivets, or a combination of any thereof. Because sheathing boards comprise polyisocyanurate foam or extruded polystyrene, which have relatively low fastener pull-out strength, care must be used when mechanically fastening sheathing boards to frames so as not to damage the sheathing board.

Alternatively, the sheathing board can be attached to the front frame surface by the use of one or more adhesives. The adhesives may be selected from latex-based adhesives, reactive hot melts, polyester adhesives, polyamide adhesives, acrylic adhesives, one-component epoxy-based adhesives, one-component polyurethane-based adhesives, two-component polyurethane-based adhesives, and combinations of any thereof. Also, as described above, a foam material may be used as the adhesive. For example, a layer of foam may be applied to the sheathing board, the front frame surface, or both, before positioning and attaching the sheathing board to the front frame surface.

As described above, sheathing boards can comprise facers on both sides of a polyisocyanurate foam layer or an extruded polystyrene layer, which may be the same or different. Examples of suitable facer materials include, but are not limited to, fiberglass mats, glass fiber-reinforced cellulosic felts, coated and polymer-bonded fiber mats (e.g., fibrous glass mats bonded with an organic polymer binder and coated with an organic polymer coating, clay, or other inorganic coating), foils (e.g., aluminum foil), coated foils, foil/membrane laminates, foil/glass composites, and polyolefin films (such as TYVEK® materials, available from DuPont; or TYPAR® materials, available from Fiberweb, Inc.).

The sheathing board 70 attached to the frame 11 may comprise multiple separate sheathing boards (i.e., multiple sections) which may be joined together by tape or caulk or polyurethane foam to form the sheathing board 70. The foam layer 30, which adheres to the sheathing board, comprises a foam material deposited into the frame 11. As used in this specification, the term "foam material" refers to a substance that is formed by trapping pockets of gas in a liquid or solid. For example, a foam material can be a "closed-cell foam," which as used in this specification refers to foam that contains discrete, non-interconnecting cells. Examples of foam material that can be used with the present invention include foam materials made with polyurethane, polyisocyanurate (also referred to as polyiso, as described above), and mixtures thereof. As described above, the foam material may be substantially free, may be essentially free, and may be completely free of halogen containing flame retardant additives.

As shown in FIGS. 10A, 10B, 13, 14A, 14B, and 15, the foam material can be deposited into the frame 11 such that the foam material forms a foam layer 30 within at least a portion of the frame 11 between the front frame surface 11a and the rear frame surface 11b, and adheres to the sheathing board 70.

Referring to FIGS. 13, 14A, and 14B, the foam layer 30 can be dimensioned to expand to a position intermediate the front frame surface 11a and the rear frame surface 11b, thereby forming a gap 40 within the wall panel 10 between the foam layer 30 and the rear frame surface 11b. FIGS. 10A and 10B further show that the gap 40 can be used as an area to incorporate home utility components 42 such as electrical wires, cords, heating and cooling pipes, and plumbing fixtures. These home utility components may be inserted into the gap 40 located between the foam layer 30 and the rear frame surface 11b such that utilities components are not surrounded by or contacting the foam layer 30. In one example, the gap 40 can comprises at least two inches as measured between the foam layer and the rear frame surface 14.

Figure 15:
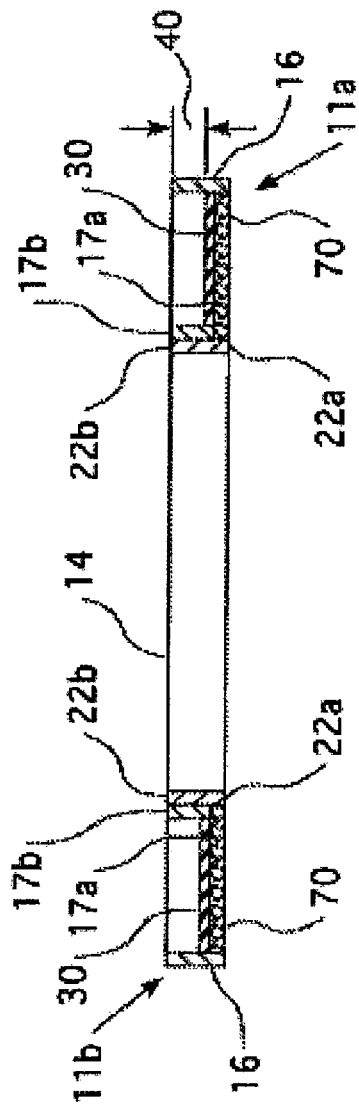
FIG. 15 is a top cross-sectional view of the wall panel having a door or window opening.

When secondary support members 20 and/or tertiary support members 22 are used with the wall panel 10 to form a secondary cavity 26, the secondary cavity 26 can be free of foam. For example, the foam layer 30 does not extend beyond and over the front secondary support surfaces 20a of the secondary members 20, the front tertiary support surfaces 22a of the tertiary support members 22, and/or beyond and over at least a portion of the front surfaces of other members that help form the secondary cavity 26. FIG. 15, for example, shows a top cross-sectional view with the foam layer 30 not extending beyond the front tertiary support surface 22a of the tertiary members 22. In such cases, corresponding openings may also be present in the sheathing board 70.

The foam layer 30 can be formed in-situ during the manufacturing process. The term "formed in-situ during the manufacturing process," as used in this specification, refers to the formation of a foam layer 30 as described in this specification during manufacturing of the foam wall panel 10 off-site at a facility remote or away from a building construction site. As such, the foam layer 30 may be formed not at a construction site as is required by conventional methods, but instead as a component of the pre-fabricated wall panel 10.

The foam layer 30 is able to fill tight spaces and seal gaps that may not be visible to the naked eye. The foam layer 30 can also act as a vapor and thermal insulating barrier, which reduces energy consumption in buildings and residential homes when the wall panel 10 is used as a constituent wall panel. The foam layer 30 may provide structural stability to the wall panel 10, such as improved wall racking strength, which refers to the ability of a wall structure to maintain its shape under shear stress.

The wall panels described above in connection with FIGS. 10A-15 can be used for the production of the wall structures described in this specification. For example, the wall panels (comprising a frame, an attached sheathing board, and a foam layer positioned in a cavity) can be provided at a building site (e.g., delivered to the building site) and assembled into an incomplete exterior wall structure. The incomplete exterior wall structure comprising multiple wall panels can be assembled on and attached to a building foundation. A roof structure can be installed on the incomplete exterior wall structure. Additional stucco cladding components, such as, for example, corner beads, weep screeds, control joints, and expansion joints, can be installed. A bond break layer and a lath layer, as described above, can be applied to the incomplete exterior wall structure covering the multiple assembled wall panels. A stucco layer can be applied onto and integrated into the lath layer over the multiple assembled wall panels to complete the exterior-facing surface of the wall structure.

The wall structures and the method of producing the wall structures described in this specification eliminate many of the typical construction steps involved in the production of stucco walls and provide a more robust system in terms of ease of installation, racking strength, insulating properties (R-values), and durability. For example, the wall panels (comprising the frame, the attached sheathing board, and the foam layer positioned in the frame cavities) can be engineered and pre-fabricated off-site and provided as necessary to building sites. This eliminates the site framing of walls and the installation of cavity insulation such as fiberglass into the walls. The facer material attached to the front face of a polyisocyanurate foam layer of a polyiso board (e.g., a glass mat material, foil, or the like), or the front face (with or without optional facer materials) of an extruded polystyrene board, provides a primary drainage plane integrated into the sheathing board that eliminates the separate application of building paper or other wrapping product over the open frame structure. The sheathing board also eliminates the need for window, door, or other penetration pre-flashing. The pre-attachment of the sheathing boards to the frames eliminates the need for on-site shear bracing with OSBs or T-bracing. The sheathing boards simultaneously provide thermal insulation, an integral drainage plane, and a rigid backing for the application of the exterior stucco layer, which eliminates the need for the separate installation of an EPS bond break layer over the primary drainage plane.

Additionally, as noted above, typical methods of stucco construction require at least three separate sets of fasteners, such as nails and staples, to penetrate the various layers and engage the wooden studs of the frame: (1) the fasteners attaching the primary drainage plane to the frame; (2) the fasteners attaching the bond break panels to the frame, which necessarily penetrate through the primary drainage plane; and (3) the fasteners attaching the lath to the frame, which necessarily penetrate through both the bond break panels and the primary drainage plane. The wall structure and method described in this specification can decrease the sets of fastener penetrations from three to one with the use of a pre-bonded combination of a bond break layer and a lath layer (e.g., a paper-backed metal wire lath), in which the bond break layer and the lath layer are simultaneously attached to the frame with one set of fasteners that penetrate through the sheathing board. The decrease in the number of fasteners improves the overall durability of the system by eliminating approximately two-thirds of the pathways for water infiltration into the interior of the wall structure. Furthermore, the wall structure eliminates the need for the inspection and caulking of fasteners that miss the frame because such fasteners would penetrate into the cavity foam layer and therefore be automatically encapsulated and isolated in the wall structure.

EXAMPLES

Various features and characteristics of examples of the invention include, but are not limited to, the following numbered clauses:

1. A wall structure comprising: a frame comprising: a first member; a second member spaced apart from the first member; and two side members extending between the first member and the second member, wherein the first member, the second member, and the two side members each comprise a front surface and a rear surface that form a front frame surface and a rear frame surface; a sheathing board attached to the front frame surface, wherein the sheathing board, the first and second members, and the two side members define a cavity within the frame; a foam layer located within the cavity and adhered to a rear-facing surface of the sheathing board; a bond break layer located adjacent to a front-facing surface of the sheathing board; a lath layer located adjacent to the bond break layer; and a stucco layer integrated into the lath layer.

2. The wall structure of clause 1, wherein the bond break layer comprises an asphalt-impregnated kraft paper, an asphalt-impregnated felt paper, an extruded polystyrene layer, an expanded polystyrene layer, a polyiso layer, a polyethylene sheet or film, a polypropylene sheet or film, a poly(vinyl chloride) sheet or film, a woven house wrap, a perforated housewrap, a nonmoven and spunbonded polyolefin sheet or film, a woven and perforated polyolefin sheet or film, a layer comprising a three-dimensional matrix of randomly-oriented extruded polymer filaments, or a fiberboard.

3. The wall structure of clause 1 or clause 2, wherein the bond break layer comprises a Grade D 60-minute building paper.

4. The wall structure of any one of clauses 1-3, wherein the lath layer comprises a self-furred steel wire lath.

5. The wall structure of any one of clauses 1-4, wherein the bond break layer and the lath layer are pre-bonded together, and wherein the pre-bonded combination of the bond break layer and the lath layer are positioned on the front-facing surface of the sheathing board and attached to the frame with one set of fasteners that penetrate through the sheathing board.

6. The wall structure of clause 5, wherein the bond break layer and the lath layer are pre-bonded together with an adhesive.

7. The wall structure of clause 5, wherein the one set of fasteners attaching the combination of the bond break layer and the lath layer to the frame comprise nails, staples, or screws, or a combination of any thereof.

8. The wall structure of clause 5, wherein the pre-bonded combination of the bond break layer and the lath layer comprises a paper-backed metal wire lath.

9. The wall structure of clause 8, wherein the bond break layer comprises a Grade D 60-minute building paper.

10. The wall structure of clause 8, wherein the metal wire lath comprises a self-furred steel wire lath.

11. The wall structure of any one of clauses 1-10, wherein the sheathing board comprises a polyiso board comprising facer materials attached to and covering a front face and a rear face of a polyisocyanurate foam layer.

12. The wall structure of clause 11, wherein the facer materials comprise fiberglass mat, glass fiber-reinforced cellulosic felt, coated and polymer-bonded fiber mat, foil, coated foil, foil/membrane laminate, foil/glass composite, or polyolefin film.

13. The wall structure of any one of clauses 1-10, wherein the sheathing board comprises an extruded polystyrene board.

14. The wall structure of any one of clauses 1-13, wherein the foam layer comprises polyurethane or polyisocyanurate, or mixtures thereof.

15. The wall structure of any one of clauses 1-13, wherein the foam layer is substantially free of halogen-containing flame retardant additives.

16. The wall structure of any one of clauses 1-13, wherein the foam layer is completely free of halogen containing flame retardant additives.

17. The wall structure of any one of clauses 1-16, wherein the sheathing board is attached to the front faces of the first and second members, and to the front faces of the two side members, with fasteners.

18. The wall structure of clause 17, wherein the fasteners comprise nails, staples, or screws, or a combination of any thereof.

19. The wall structure of any one of clauses 1-18, wherein the sheathing board is attached to the front faces of the first and second members, and to the front faces of the two side members, with an adhesive.

20. The wall structure of clause 19, wherein the adhesive comprises a foam material that is the same material comprising the foam layer.

21. The wall structure of any one of clauses 1-20, wherein the foam layer comprises a thickness extending from the rear-facing surface of the sheathing board to a position intermediate the front frame surface and the rear frame surface such that a gap is formed within the frame between a rear-facing surface of the foam layer and the rear frame surface.

22. The wall structure of any one of clauses 1-21, further comprising a primary support member positioned between the two side members and extending between the first member and the second member, wherein the primary support member comprises a front primary support surface and an opposite rear primary support surface, and wherein the front primary support surface corresponds to the front frame surface.

23. The wall structure of clause 22, wherein the rear primary support surface corresponds to the rear frame surface.

24. The wall structure of clause 22, wherein the sheathing board is attached to the front frame surface and the front primary support surface.

25. The wall structure of clause 22, wherein the sheathing board, the first and second members, the two side members, and the primary support member define a two or more cavities within the frame, and wherein the foam layer is located within the two or more cavities and adhered to the sheathing board.

26. The wall structure of clause 22, wherein the frame further comprises one or more secondary support members extending between two adjacent primary support members, or extending between a primary support member and a side member, such that a secondary opening is formed within the frame.

27. The wall structure of clause 26, wherein the secondary opening is free of foam, and a corresponding opening is present in the sheathing board.

28. The wall structure of clause 26, wherein the frame further comprises one or more tertiary support members extending between two secondary support members, or extending between a secondary support member and the first member or the second member.

29. A method for producing a wall structure comprising: providing a wall panel, the wall panel comprising: a frame comprising: a first member; a second member spaced apart from the first member; and two side members extending between the first member and the second member, wherein the first member, the second member, and the two side members each comprise a front surface and a rear surface that form a front frame surface and a rear frame surface; a sheathing board attached to the front frame surface, wherein the sheathing board, the first and second members, and the two side members define a cavity within the frame; and a foam layer located within the cavity and adhered to a rear-facing surface of the sheathing board; positioning a bond break layer and a lath layer adjacent to a front-facing surface of the sheathing board; attaching the bond break layer and the lath layer to the frame; and applying a stucco layer integrated into the lath layer.

30. The method of clause 29, further comprising: assembling multiple wall panels into an incomplete wall structure; positioning the bond break layer and the lath layer adjacent to the front-facing surfaces of the sheathing board and over the incomplete wall structure; attaching the bond break layer and the lath layer to the frames of the multiple assembled panels; and applying a stucco layer integrated into the lath layer to complete the wall structure.

31. The method of clause 29 or clause 30, wherein the bond break layer comprises an asphalt-impregnated kraft paper, an asphalt-impregnated felt paper, an extruded polystyrene layer, an expanded polystyrene layer, a polyiso layer, a polyethylene sheet or film, a polypropylene sheet or film, a poly(vinyl chloride) sheet or film, a woven house wrap, a perforated housewrap, a nonmoven and spunbonded polyolefin sheet or film, a woven and perforated polyolefin sheet or film, a layer comprising a three-dimensional matrix of randomly-oriented extruded polymer filaments, or a fiberboard.

32. The method of any one of clauses 29-31, wherein the bond break layer comprises a Grade D 60-minute building paper.

33. The method of any one of clauses 29-32, wherein the lath layer comprises a self-furred steel wire lath.

34. The method of any one of clauses 29-33, wherein the bond break layer and the lath layer are pre-bonded together, and wherein the pre-bonded combination of the bond break layer and the lath layer are positioned on the front-facing surface of the sheathing board and attached to the frame with one set of fasteners that penetrate through the sheathing board.

35. The method of clause 34, wherein the pre-bonded combination of the bond break layer and the lath layer comprises a paper-backed metal wire lath.

36. The method of any one of clauses 29-35, wherein the sheathing board comprises a polyiso board comprising facer materials attached to and covering a front face and/or a rear face of a polyisocyanurate foam layer.

37. The method of clause 36, wherein the facer materials comprise fiberglass mat, glass fiber-reinforced cellulosic felt, coated and polymer-bonded fiber mat, foil, coated foil, foil/membrane laminate, foil/glass composite, or polyolefin film.

38. The method of any one of clauses 29-35, wherein the sheathing board comprises an extruded polystyrene board.

39. The method of any one of clauses 29-38, wherein the foam layer comprises polyurethane or polyisocyanurate, or mixtures thereof.

40. The method of any one of clauses 29-39, wherein applying the stucco layer comprises: applying a brown coat integrated into the lath layer; and applying a finish coating onto the brown coat.

41. The method of any one of clauses 29-40, wherein applying the stucco layer comprises: applying a scratch coat integrated into the lath layer; applying a brown coat onto the scratch coat; and applying a finish coating onto the brown coat.

Various features and characteristics of the inventions are described in this specification to provide an overall understanding of the disclosed wall structures and method of production. It is understood that the various features and characteristics described in this specification can be combined in any suitable manner regardless of whether such features and characteristics are expressly described in combination in this specification. The Applicant expressly intends such combinations of features and characteristics to be included within the scope of this specification. As such, the claims can be amended to recite, in any combination, any features and characteristics expressly or inherently described in, or otherwise expressly or inherently supported by, this specification. Furthermore, the Applicant reserves the right to amend the claims to affirmatively disclaim features and characteristics that may be present in the prior art, even if those features and characteristics are not expressly described in this specification. Therefore, any such amendments will not add new matter to the specification or claims, and will comply with written description and sufficiency of description requirements (e.g., 35 U.S.C. §112(a) and Article 123(2) EPC). The wall structures and methods disclosed in this specification can comprise, consist of, or consist essentially of the various features and characteristics described in this specification.

Also, any numerical range recited in this specification describes all sub-ranges of the same numerical precision (i.e., having the same number of specified digits) subsumed within the recited range. For example, a recited range of "1.0 to 10.0" describes all sub-ranges between (and including) the recited minimum value of 1.0 and the recited maximum value of 10.0, such as, for example, "2.4 to 7.6," even if the range of "2.4 to 7.6" is not expressly recited in the text of the specification. Accordingly, the Applicant reserves the right to amend this specification, including the claims, to expressly recite any sub-range of the same numerical precision subsumed within the ranges expressly recited in this specification. All such ranges are inherently described in this specification such that amending to expressly recite any such sub-ranges will not add new matter to the specification or claims, and will comply with written description and sufficiency of description requirements (e.g., 35 U.S.C. §§112(a) and Article 123(2) EPC). Additionally, numerical parameters described in this specification should be construed in light of the number of reported significant digits, the numerical precision of the number, and by applying ordinary rounding techniques. It is also understood that numerical parameters described in this specification will necessarily possess the inherent variability characteristic of the underlying measurement techniques used to determine the numerical value of the parameter.

Any patent, publication, or other disclosure material identified in this specification is incorporated by reference into this specification in its entirety unless otherwise indicated, but only to the extent that the incorporated material does not conflict with existing descriptions, definitions, statements, or other disclosure material expressly set forth in this specification. As such, and to the extent necessary, the express disclosure as set forth in this specification supersedes any conflicting material incorporated by reference. Any material, or portion thereof, that is incorporated by reference into this specification, but which conflicts with existing definitions, statements, or other disclosure material set forth in this specification, is only incorporated to the extent that no conflict arises between that incorporated material and the existing disclosure material. Applicant reserves the right to amend this specification to expressly recite any subject matter, or portion thereof, incorporated by reference.

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and can be employed or used in an implementation of the described processes, compositions, and products. Further, the use of a singular noun includes the plural, and the use of a plural noun includes the singular, unless the context of the usage requires otherwise.

What is claimed is:

1. A wall structure comprising:
   a frame comprising:
     a first member;
     a second member spaced apart from the first member; and
     two side members extending between the first member and the second member, wherein the first member, the second member, and the two side members each comprise a front surface and a rear surface that form a front frame surface and a rear frame surface;
   a sheathing board attached to the front frame surface, wherein the sheathing board, the first and second members, and the two side members define a cavity within the frame;
   a foam layer located within the cavity and adhered to a rear-facing surface of the sheathing board;
   a bond break layer located adjacent to a front-facing surface of the sheathing board;
   a lath layer located adjacent to the bond break layer; and
   a stucco layer integrated into the lath layer,
   wherein the sheathing board comprises a polyisocyanurate foam layer and a facer material attached to a front face and a rear face of the polyisocyanurate foam layer.

2. The wall structure of claim 1, wherein the bond break layer comprises an asphalt-impregnated kraft paper, an asphalt-impregnated felt paper, an extruded polystyrene layer, an expanded polystyrene layer, a polyiso layer, a polyethylene sheet or film, a polypropylene sheet or film, a poly(vinyl chloride) sheet or film, a woven house wrap, a perforated housewrap, a nonmoven and spunbonded polyolefin sheet or film, a woven and perforated polyolefin sheet or film, a layer comprising a three-dimensional matrix of randomly-oriented extruded polymer filaments, or a fiberboard.

3. The wall structure of claim 1, wherein the bond break layer comprises a Grade D 60-minute building paper.

4. The wall structure of claim 1, wherein the lath layer comprises a self-furred steel wire lath.

5. The wall structure of claim 1, wherein the bond break layer and the lath layer are pre-bonded together, and wherein the pre-bonded combination of the bond break layer and the lath layer are positioned on the front-facing surface of the sheathing board and attached to the frame with one set of fasteners that penetrate through the sheathing board.

6. The wall structure of claim 5, wherein the pre-bonded combination of the bond break layer and the lath layer comprises a bond break layer comprising paper and a lath layer comprising metal wire lath.

7. The wall structure of claim 1, wherein the facer material comprises fiberglass mat, glass fiber-reinforced cellulosic felt, coated and polymer-bonded fiber mat, foil, coated foil, foil/membrane laminate, foil/glass composite, or polyolefin film.

8. The wall structure of claim 1, wherein the foam layer comprises polyurethane or polyisocyanurate, or mixtures thereof.

9. The wall structure of claim 1, wherein the sheathing board is attached to the front faces of the first and second members, and to the front faces of the two side members, with fasteners.

10. The wall structure of claim 1, wherein the sheathing board is attached to the front faces of the first and second members, and to the front faces of the two side members, with an adhesive.

11. The wall structure of claim 1, wherein the foam layer comprises a thickness extending from the rear-facing surface of the sheathing board to a position intermediate the front frame surface and the rear frame surface such that a gap is formed within the frame between a rear-facing surface of the foam layer and the rear frame surface.

12. A method for producing the wall structure of claim 1 comprising:
   providing a wall panel, the wall panel comprising:
      a frame comprising:
         a first member;
         a second member spaced apart from the first member; and
         two side members extending between the first member and the second member, wherein the first member, the second member, and the two side members each comprise a front surface and a rear surface that form a front frame surface and a rear frame surface;
      a sheathing board attached to the front frame surface, wherein the sheathing board, the first and second members, and the two side members define a cavity within the frame; and
      a foam layer located within the cavity and adhered to a rear-facing surface of the sheathing board;
   positioning a bond break layer and a lath layer adjacent to a front-facing surface of the sheathing board;
   attaching the bond break layer and the lath layer to the frame; and
   applying a stucco layer integrated into the lath layer, wherein the sheathing board comprises a polyisocyanurate foam layer and a facer material attached to a front face and a rear face of the polyisocyanurate foam layer.

13. The method of claim 12, further comprising:
   assembling multiple wall panels into an incomplete wall structure;
   positioning the bond break layer and the lath layer adjacent to the front-facing surfaces of the sheathing board and over the incomplete wall structure;
   attaching the bond break layer and the lath layer to the frames of the multiple assembled panels; and
   applying a stucco layer integrated into the lath layer to complete the wall structure.

14. The method of claim 12, wherein the lath layer comprises a self-furred steel wire lath, and wherein the bond break layer comprises an asphalt-impregnated kraft paper, an asphalt-impregnated felt paper, an extruded polystyrene layer, an expanded polystyrene layer, a polyiso layer, a polyethylene sheet or film, a polypropylene sheet or film, a poly(vinyl chloride) sheet or film, a woven house wrap, a perforated housewrap, a nonmoven and spunbonded polyolefin sheet or film, a woven and perforated polyolefin sheet or film, a layer comprising a three-dimensional matrix of randomly-oriented extruded polymer filaments, or a fiberboard.

15. The method of claim 12, wherein the bond break layer and the lath layer are pre-bonded together, and wherein the pre-bonded combination of the bond break layer and the lath layer are positioned on the front-facing surface of the sheathing board and attached to the frame with one set of fasteners that penetrate through the sheathing board.

16. The method of claim 15, wherein the pre-bonded combination of the bond break layer and the lath layer comprises a paper-backed metal wire lath.

17. The method of claim 16, wherein the bond break layer comprises a Grade D 60-minute building paper and the metal wire lath comprises a self-furred steel wire lath.

18. The method of claim 12, wherein the facer materials comprise fiberglass mat, glass fiber-reinforced cellulosic felt, coated and polymer-bonded fiber mat, foil, coated foil, foil/membrane laminate, foil/glass composite, or polyolefin film.

19. The method of claim 12, wherein the foam layer comprises polyurethane or polyisocyanurate, or mixtures thereof.

20. The method of claim 12, wherein applying the stucco layer comprises:
   applying a brown coat integrated into the lath layer; and
   applying a finish coating onto the brown coat.

21. The method of claim 12, wherein applying the stucco layer comprises:
   applying a scratch coat integrated into the lath layer;
   applying a brown coat onto the scratch coat; and
   applying a finish coating onto the brown coat.

* * * * *